US010579187B2

(12) United States Patent
Takahashi et al.

(10) Patent No.: US 10,579,187 B2
(45) Date of Patent: Mar. 3, 2020

(54) DISPLAY CONTROL APPARATUS, DISPLAY CONTROL METHOD AND DISPLAY CONTROL PROGRAM

(71) Applicant: Sony Corporation, Tokyo (JP)

(72) Inventors: Masahiro Takahashi, Kanagawa (JP); Junichirou Sakata, Tokyo (JP); Kazuma Takahashi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/169,860

(22) Filed: Oct. 24, 2018

(65) Prior Publication Data

US 2019/0073081 A1 Mar. 7, 2019

Related U.S. Application Data

(63) Continuation of application No. 14/779,808, filed as application No. PCT/JP2014/001229 on Mar. 6, 2014, now Pat. No. 10,168,822.

(30) Foreign Application Priority Data

Apr. 1, 2013 (JP) ................................ 2013-076174

(51) Int. Cl.
*G06F 3/041* (2006.01)
*G06F 3/0482* (2013.01)
(Continued)

(52) U.S. Cl.
CPC .......... *G06F 3/0416* (2013.01); *G06F 3/0412* (2013.01); *G06F 3/0482* (2013.01);
(Continued)

(58) Field of Classification Search
None
See application file for complete search history.

(56) References Cited

U.S. PATENT DOCUMENTS 6,466,237 B1 10/2002 Miyao et al.
6,487,360 B1 11/2002 Sumiyoshi et al.
(Continued)

FOREIGN PATENT DOCUMENTS

CN 101714057 A 5/2010
CN 101840409 A 9/2010
(Continued)

OTHER PUBLICATIONS

International Search Report; International Application No. PCT/JP2014/001229; dated Apr. 15, 2014. (Form PCT/ISA/210).
(Continued)

*Primary Examiner* — Dorothy Harris
(74) *Attorney, Agent, or Firm* — Michael Best & Friedrich LLP

(57) ABSTRACT

A display control apparatus includes a display control unit for controlling a display unit for displaying an image, the display control unit being configured to display a plurality of represented images that represent a plurality of image groups classified depending on related information of the images on the display unit in a first display mode, and display related images relating to the represented images between a plurality of the represented images displayed in the first display mode depending on a user input on the display unit in a second display mode.

20 Claims, 23 Drawing Sheets

(51) Int. Cl.
*G06F 3/0488* (2013.01)
*G06F 3/0484* (2013.01)
*G06F 3/0481* (2013.01)
*G06F 3/0485* (2013.01)
*G06F 3/0486* (2013.01)

(52) U.S. Cl.
CPC .......... *G06F 3/0485* (2013.01); *G06F 3/0486* (2013.01); *G06F 3/0488* (2013.01); *G06F 3/04817* (2013.01); *G06F 3/04842* (2013.01); *G06F 3/04845* (2013.01); *G06F 2203/04808* (2013.01)

(56) References Cited

U.S. PATENT DOCUMENTS

| | | | |
|---|---|---|---|
| 7,020,848 B2* | 3/2006 | Rosenzweig | G06F 17/30265 707/E17.026 |
| 7,689,933 B1 | 3/2010 | Parsons | |
| 7,805,681 B2* | 9/2010 | Hansson | G06F 16/68 715/751 |
| 7,970,240 B1* | 6/2011 | Chao | G06F 17/30274 382/305 |
| 8,200,669 B1 | 6/2012 | Iampietro et al. | |
| 8,682,085 B2* | 3/2014 | Isogai | G06F 17/30247 382/118 |
| 8,687,089 B2* | 4/2014 | Choi | G06F 3/0486 348/231.2 |
| 8,893,050 B2* | 11/2014 | Bogner | G06F 3/0481 715/810 |
| 10,168,822 B2* | 1/2019 | Takahashi | G06F 3/0416 |
| 2001/0015756 A1* | 8/2001 | Wilcock | G06F 17/30265 348/158 |
| 2001/0046330 A1* | 11/2001 | Shaffer | G06F 17/30256 382/284 |
| 2002/0048413 A1* | 4/2002 | Kusunoki | H04N 1/00132 382/282 |
| 2002/0075329 A1* | 6/2002 | Prabhu | G06F 3/0481 715/854 |
| 2004/0197013 A1* | 10/2004 | Kamei | G06K 9/00268 382/118 |
| 2005/0027712 A1* | 2/2005 | Gargi | G06F 17/30265 |
| 2005/0192924 A1* | 9/2005 | Drucker | G06F 3/0483 |
| 2006/0236251 A1 | 10/2006 | Kataoka et al. | |
| 2006/0242121 A1 | 10/2006 | DeVorchik et al. | |
| 2006/0259477 A1* | 11/2006 | Morita | G06F 17/30265 |
| 2007/0016575 A1 | 1/2007 | Hurst-Hiller et al. | |
| 2007/0174790 A1* | 7/2007 | Jing | G06F 17/30265 715/838 |
| 2007/0279438 A1* | 12/2007 | Takakura | G06F 3/0481 345/629 |
| 2008/0086703 A1 | 4/2008 | Flynt et al. | |
| 2008/0092054 A1 | 4/2008 | Bhumkar et al. | |
| 2008/0155458 A1* | 6/2008 | Fagans | G06F 3/04817 715/781 |
| 2008/0172410 A1 | 7/2008 | Takimoto | |
| 2010/0085318 A1* | 4/2010 | Lee | G06F 3/04883 345/173 |
| 2010/0171763 A1* | 7/2010 | Bhatt | G06F 17/30274 345/660 |
| 2011/0122153 A1* | 5/2011 | Okamura | G01C 21/00 345/629 |
| 2011/0150340 A1* | 6/2011 | Gotoh | G06F 17/30247 382/190 |
| 2011/0202880 A1 | 8/2011 | Kawana et al. | |
| 2011/0243452 A1 | 10/2011 | Sakaguchi et al. | |
| 2012/0066573 A1* | 3/2012 | Berger | H04N 1/00196 715/202 |
| 2012/0299955 A1 | 11/2012 | Fagans et al. | |
| 2012/0311446 A1* | 12/2012 | Nakano | G11B 20/0021 715/716 |
| 2014/0149940 A1 | 5/2014 | Li et al. | |
| 2014/0301653 A1* | 10/2014 | Murphy-Chutorian | G06K 9/00221 382/224 |

FOREIGN PATENT DOCUMENTS

| | | |
|---|---|---|
| JP | 2007-179351 A | 7/2007 |
| JP | 2008-175994 A | 7/2008 |
| JP | 2008-312060 A | 12/2008 |
| JP | 2010-026565 A | 2/2010 |
| JP | 2010086641 A | 4/2010 |
| JP | 2012-069009 A | 4/2012 |
| JP | 2012-138679 A | 7/2012 |

OTHER PUBLICATIONS

Extended European Search Report dated Oct. 12, 2016 for corresponding European Application No. 14778105.8.
Japanese Office Action dated Sep. 12, 2017 for corresponding Japanese Application No. 2015-509878.
Chinese Office Action dated Feb. 13, 2018 for corresponding Chinese Application No. 201480017786.6.
Chinese Office Action dated Apr. 15, 2019 for corresponding Chinese Application No. 201480017786.6.
European Communication Pursuant to Article 94(3) EPC dated Nov. 22, 2019 for corresponding European Application No. 14778105.8.

* cited by examiner

DISPLAY CONTROL APPARATUS, DISPLAY CONTROL METHOD AND DISPLAY CONTROL PROGRAM

CROSS REFERENCES TO RELATED APPLICATIONS

This application is a Continuation Application of U.S. patent application Ser. No. 14/779,808, filed Sep. 24, 2015, which is a U.S. National Stage Application of PCT/JP2014/001229, filed Mar. 6, 2014, which claims priority to Japanese Patent Application 2013-076174 filed in the Japan Patent Office on Apr. 1, 2013, the entire contents of which being incorporated herein by reference.

TECHNICAL FIELD

The present technology relates to a display control apparatus, a display control method and a display control program.

BACKGROUND ART

In recent years, a camera is mounted to a smartphone, a mobile phone device, or a tablet terminal. An image quality and a usability of the camera are improved, whereby a general user captures a number of images. In addition, a variety of net services handling the images is spreading. In this way, an amount of the images handled by a user is explosively increased.

Then, in order to browse a number of images effectively, a technology to classify and display the images along a time axis of year, month, and day.
[Patent Document 1] Japanese Patent Application Laid-open No. 2007-179351

SUMMARY OF INVENTION

Problem to be Solved by the Invention

In recent years, as image recognition techniques are improved, it becomes possible to browse images by classifying and organizing images based not only a time but also a type of a photographic subject. It is desirable to further improve the usability of a user interface using the image recognition techniques.

The present technology is made in view of the problems, and an object is to provide a display control apparatus, a display control method and a display control program by which a user can easily search and browse images.

Means for Solving the Problem

In order to solve the above-described problems, a first technology is a display control apparatus, including a display control unit for controlling a display unit for displaying an image, the display control unit being configured to display a plurality of represented images that represent a plurality of image groups classified depending on related information of the images on the display unit in a first display mode, and display related images relating to the represented images between a plurality of the represented images displayed in the first display mode depending on a user input on the display unit in a second display mode.

A second technology is a method of controlling a display, including displaying a plurality of represented images that represent a plurality of image groups classified depending on related information of the images on the display unit for displaying the images in a first display mode, and displaying related images relating to the represented images in a second display mode between a plurality of the represented images displayed in the first display mode depending on a user input.

A third technology is a display control program for executing a method of controlling a display by a computer, the method including displaying a plurality of represented images that represent a plurality of image groups classified depending on related information of the images on the display unit for displaying the images in a first display mode, and displaying related images relating to the represented images between a plurality of the represented images displayed in the first display mode depending on a user input.

Effect of the Invention

According to the present technology, a user can easily search and browse images.

BRIEF DESCRIPTION OF DRAWINGS

FIG. 21A is a diagram showing a display example of a represented image display in the case of applying the present technology to a smartphone, FIG. 21B is a diagram showing a display example of a represented image display in the case of applying the present technology to a tablet terminal, and FIG. 21C is a diagram showing a display example of a represented image display in the case of applying the present technology to a personal computer, and FIG. 21D is a diagram showing a display example of a represented image display in the case of applying the present technology to a television receiver.

FIG. 23A is a diagram showing a display example of an image single display in the case of applying the present technology to a smartphone, FIG. 23B is a diagram showing a display example and application icons in the case of applying the present technology to a tablet terminal, FIG. 23C is a diagram showing a display example and application UIs in the case of applying the present technology to a personal computer.

MODES FOR CARRYING OUT THE INVENTION

Figure 1:
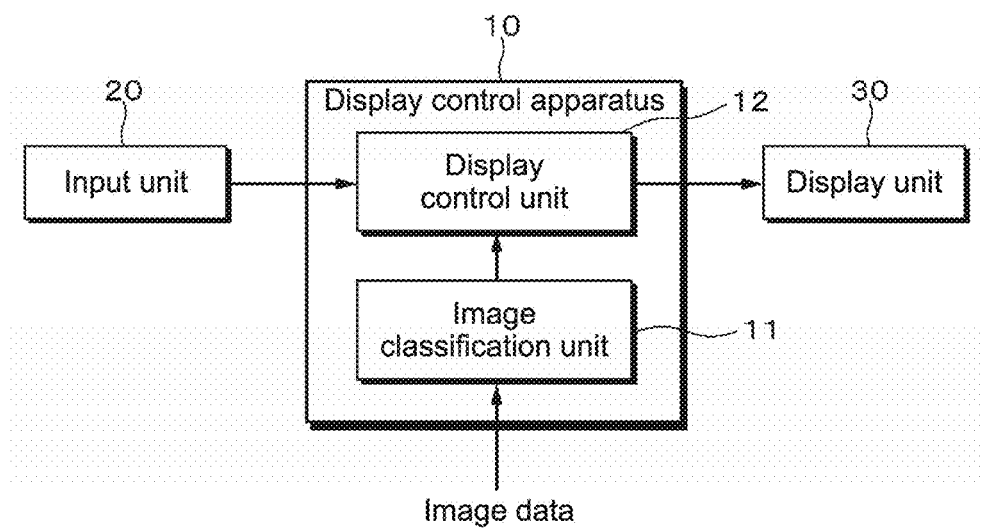
FIG. 1A is a block diagram showing a configuration of a display control apparatus.
FIG. 1B is a block diagram showing another configuration of a display control apparatus.
Figure 1:
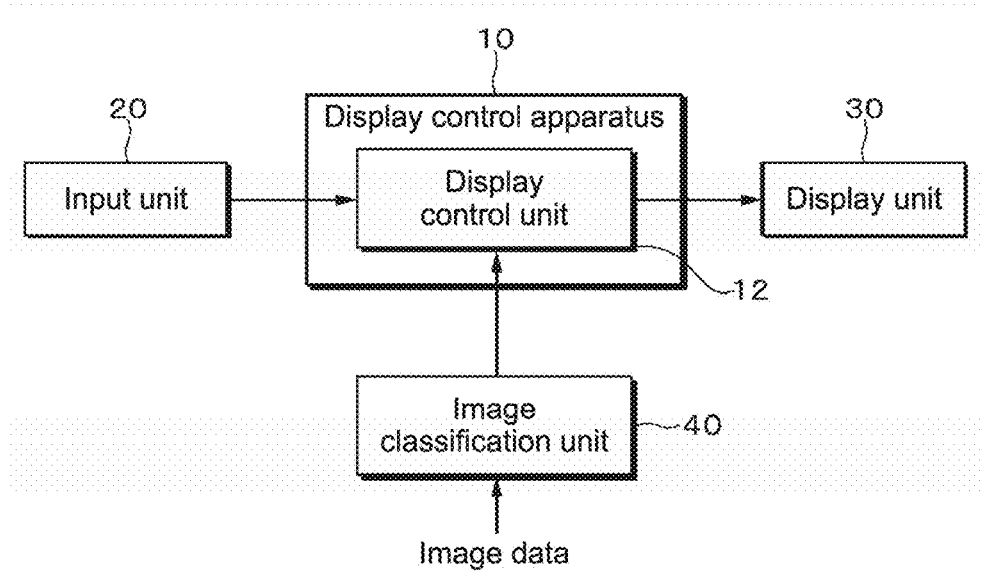

Hereinafter, referring to the drawings, embodiments of the present technology will be described in the following orders:

<1. Embodiments>
[1-1. Configuration of Display Control Apparatus]
[1-2. Processing in Display Control Apparatus]
<2. Alternative Embodiment>
<1. Embodiments>
[1-1. Configuration of Display Control Apparatus]

Firstly, referring to FIG. 1, a configuration of a display control apparatus 10 is described. FIG. 1A is a block diagram showing a configuration of the display control apparatus 10. The display control apparatus 10 includes an image classification unit 11 and a display control unit 12. The image classification unit 11 and the display control unit 12 of the display control apparatus 10 are operated by executing a predetermined program by a CPU (Central Processing Unit), for example. The display control apparatus 10 operates in a device such as a smartphone, a tablet terminal, a personal computer, a television receiver, a mobile phone and a server. It should be noted that a display control apparatus may be configured as a single apparatus.

To the display control apparatus 10, an input unit 20 and a display unit 30 included in the above described other devices are connected. Alternatively, the display control apparatus 10 may include the input unit 20 and the display unit 30. The display control apparatus 10 is provided with image data held by the above-described other devices. The image data may be provided by importing images already uploaded in an SNS (social networking service), a photo sharing site, etc. on the Internet.

The input unit 20 is an inputting means that receives a user's operation input. The input unit 20 is a touch panel integrally configured of the display unit 30, for example. The touch panel is an electrostatic capacitance touch panel, a pressure sensitive touch panel, or the like, for example. Alternatively, the input unit 20 may not be the touch panel, but may be a pointing device such as a mouse, a keyboard or the like. The display control apparatus 10 is provided with input information showing a user input content from the input unit 20. It should be noted that the following description is made referring to a touch panel where the input unit 20 and the display unit 30 are integrally configured.

The touch panel can detect respective operations made at a plurality of points simultaneously on an operation screen, i.e., a screen, and output information showing a contact position. Also, the touch panel can detect familiar and repeating operations on the operation screen, and output information showing respective contact positions.

The touch panel can receive a variety of inputs and operations including a so-called tap operation, a double tap operation, a flick operation, a drag operation, a pinch operation, and a tracing operation from a user, and output them.

The tap operation is an input operation that a finger of a user allows to be in contact with an operation screen one time for a short time. The double tap operation is an input operation that a finger allows to be in contact with an operation screen twice successively in a short interval. These operations are mainly used in a determination of the input.

The drag operation is an input operation that a user's finger is moved on an operation screen while being in contact therewith. The flick operation is an input operation that a user's finger is touched one point on an operation screen and is flicked quickly to any direction. In this way, for example, a plurality of images displayed and viewed on the display unit 30 can be switched as if the images are flicked.

The pinch operation is an input operation that user's two fingers are in contact with an operation screen simultaneously, and then open and close like pinching. The pinch operation allows a frame showing a display area on the display unit 30 to be enlarged or reduced in size. In the pinch operation, an operation that two fingers contacted are open is called as a pinch-out operation, and an operation that two fingers are closed is called as a pinch-in operation.

If an input is made to a touch panel as the input unit 20, the display control apparatus 10 is provided with input information showing a contact position from the input unit 20.

The display unit 30 is an image display means configured of an LCD (Liquid Crystal Display), a PDP (Plasma Display Panel), an organic EL (Electro Luminescence) panel or the like, for example. The display unit 30 displays the images displayed based on the processing by the display control apparatus 10, user interfaces according to the present technology or the like.

An image classification unit 11 classifies the image data provided into a plurality of categories, groups, or subgroups based on related information of the image. The category is a largest classification unit in an image classification according to the present technology. The group is an image classification unit included in the category. The subgroup is an image classification unit included in the group. Classification information showing the classification result by the image classification unit 11 is supplied to the display control unit 12.

Examples of the category include an "import time", a "main photographic subject", an "event", a "favorite", a "film location" and an "external image".

The "import time" category is based on a time to import an image to the display control apparatus 10 for displaying the image. The classification of the "import time" category may be made by recognizing a time to import the image to the display control apparatus 10 by a clock function. In the "import time" category, if the group is a "month", the subgroup is a "day", or if the group is a "year, the subgroup is a "month", for example.

The "main photographic subject" category is based on a main photographic subject in an image. The classification of the "main photographic subject" category may be made by recognizing a photographic subject such as an article and a person in an image using a known image recognition technology. As the image recognition technology, there are a matching method based on a face/person recognition technology by a template matching or brightness distribution information of a photographic subject, a method based on a skin color part or a human face feature amount included in an image, and a method based on a face feature amount. In addition, these methods may be combined to increase a recognition accuracy. In the "main photographic subject" category, the group is a "person" who is the photographic subject, and the subgroup is a "human age", for example.

The "event" category is based on an event where the image is captured. The classification of the "event" category is based on known photographic subject recognition techniques, an image captured time provided by referring to EXIF (Exchangeable image file format) data, and GPS (Global Positioning System) data.

For example, as a result of the recognition of the photograph subject, a plurality of the same persons are captured in a plurality of images. If a captured time of a plurality of the images is within a predetermined time range, it may be judged that a plurality of the images are captured at the same event. Furthermore, if it is judged that a plurality of images are captured at the same position by referring to GPS data, it may be judged that a plurality of the images are captured at the same event. Also, it may be judged that the images on which the photograph subject such as an architectural structure is captured are captured at the same event. In the "event" category, a "trip", a "party" or the like are classified as the group, and a "date of trip", a "date or time of party" or the like is classified as the subgroup.

The "favorite" category is based on a degree of the favorite to a user's image. The classification of the favorite may be made based on a time to display the image by the user, an evaluation point set by the user for each image, or the like. In the "favorite" category, depending on the degree of the favorite, the image may be divided into the group or the subgroup.

The "film location" category is based on a position where an image is captured. The classification of the "film location" category may be made based on GPS data corresponding to the image. In the "film location" category, the group is a "country, and the subgroup is a "city", a "town", or a "municipality", for example.

The "external image" category is based on a type of a service or an application if the image already uploaded in the Internet service such as the SNS and the photo sharing site or the image already imported to other application is imported to the display control apparatus 10. In the "external image" category, a specific service such as the Facebook may be classified as the group, and an album already set within the external service may be classified as the subgroup.

Further, a specific internet service such as the Facebook is defined as the category, and a group or album within the Internet service may be the group or the subgroup in the present technology. The images already imported to other application may be divided into the group or the subgroup based on the classification of the images within the application or related information such as a tag within the application.

If the SNS, the photo sharing site, or the application where the images are provided with an effect such as sepia and monochrome is defined as the category or the group, the type of the image effect may be defined as the group or the subgroup.

If the image data can be imported externally from the existing SNS, the photo sharing site, or the application to the display control apparatus 10, it is not necessary that a large amount of images is again imported to the display control apparatus 10 one by one used for the present technology. In this way, the user who has already uploaded a large amount of data in the external service or the application may easily utilize the present technology.

It should be noted that the category is not limited to the above-described content. As long as the images may be classified using any related information of the image, any category, group or subgroup may be used.

As shown in FIG. 1B, an image classification unit 40 may not be included in the display control apparatus 10 and may be disposed at an external server. In this case, the external image classification unit 40 may be provided with the image data, and the display control apparatus 10 may be provided with the image data and classification information from the external image classification unit 40. In addition, the display control apparatus 10 may hold the image data and the external image classification unit 40 may also hold the image data to perform a classification processing. From the image classification unit 11, the display control apparatus 10 may be provided with only the classification information.

The display control unit 12 controls a user interface display according to the present technology and an image display based on the classification result from the display control unit 11 in the display unit 30. Here, referring to FIG.

2 to FIG. 12, an image display mode based on the processing by the display control unit 11 will be described. In FIG. 2 to FIG. 12, the description will be made as an example case that the device where the display control apparatus 10 is operated is a smartphone, the input unit 20 is a touch panel of the smartphone, and the display unit 30 is a display of the smartphone. It should be noted that the present technology may be applicable to a device other than the smartphone as described above.

Figure 2:
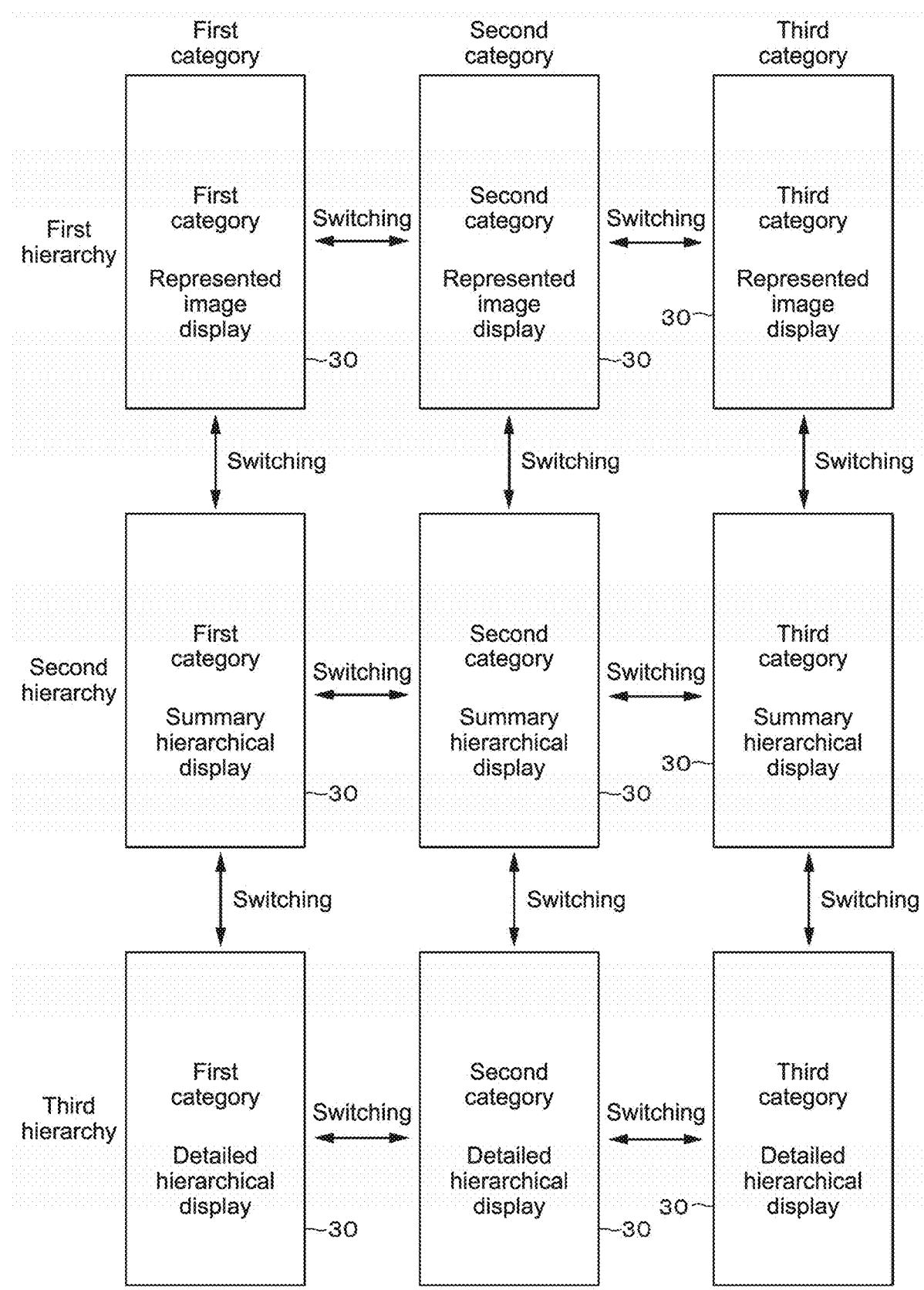
FIG. 2 is a diagram showing display modes according to the present technology.

Firstly, referring to FIG. 2, an overview of the display screen embodiment according to the present technology will be described. FIG. 2 is a diagram showing the overview of a display and a switching of the display in the display unit 30 based on the control by the display control apparatus 10.

In the present technology, a plurality of the images are classified into a plurality of the categories and displayed. Furthermore, the images are classified into the group or the subgroup in each category and displayed. Although FIG. 2 shows three categories of a first category, a second category and a third category, the number of the categories are not limited to the three.

Furthermore, in the present technology, the image in each category is displayed in three display modes. The three display modes are a represented image display, a summary hierarchical display, and a detailed hierarchical display. In addition to the hierarchical display, an image single display may be made. In the description, the represented image display is defined as the first hierarchical display, the summary hierarchical display is defined as the second hierarchical display, and the detailed hierarchical display is defined as the third hierarchical display.

As shown in FIG. 2, the displays can be mutually switched between the respective categories, and the displays can be mutually switched between the hierarchies depending on a user input.

Figure 3:
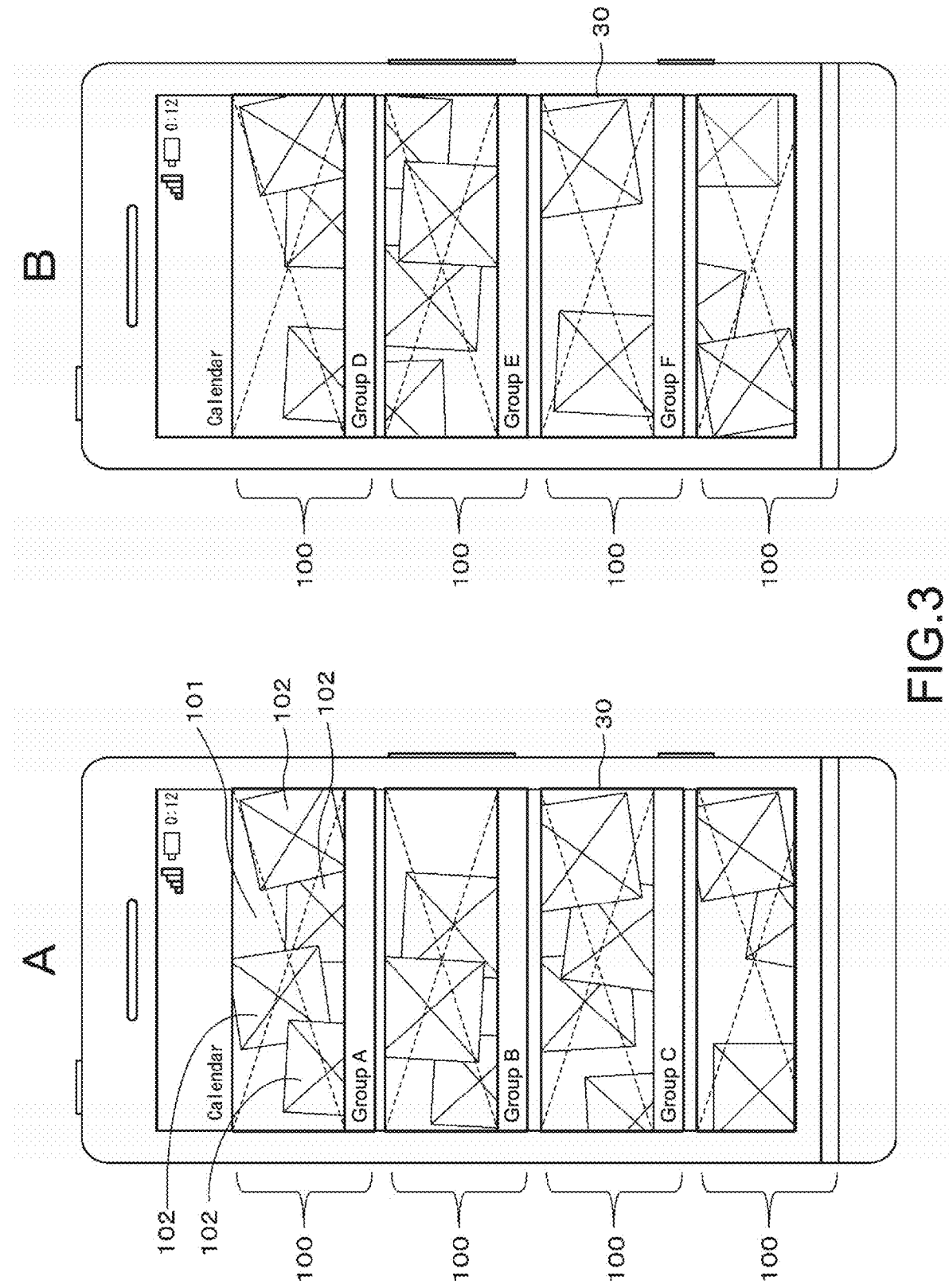
FIG. 3A is a diagram showing a display mode of a represented image display.
FIG. 3B is a diagram showing a display mode of a represented image display if a screen is scrolled.

Next, specific configuration of the respective display modes will be described. FIG. 3A shows a display mode of a represented image display in the first hierarchical display. The first hierarchical represented image display includes a plurality of represented image display areas 100, 100, 100 . . . On the represented image display area 100, an image representing the group (hereinafter referred to as a "represented image") 101 is displayed. In FIG. 3 to FIG. 6, a square having a diagonal line represents a simplified image.

At this time, as shown in FIG. 3A, group names ("group A, group B, and group C" in FIG. 3A) are displayed at positions corresponding to the respective groups. In the represented image display, the image selected from a plurality of the images included in the group is displayed as an image representing the group.

In the typical image display mode in FIG. 3A, one represented image 101 is a background image of the group, and a plurality of images relating to the represented image (herein after referred to as related images) 102, 102, . . . are superimposed and displayed on the background image. Similarly, in the group B and group C in FIG. 3A, the represented image and related images belonging to the respective groups are selected and displayed.

The images contained in the groups are scored by a variety of conditions, and the image having a highest score may be the represented image. The scoring becomes high under the following conditions: if a percentage of a face occupied in the image exceeds a certain level to the size of the image; if there is a smile face; if the face is not profile but front; or if the number of the person as the photographic subject exceeds a predetermined number. These can be attained by using a known image recognition technique, a smile detection technique, or a face direction detection technique.

In the embodiment shown in 3A, the image having a highest score among the images in the group is displayed large as the represented image 101. On the represented image 101, a plurality of images having next highest scores are superimposed and displayed as the related images 102. Such a display is applied to all groups displayed on the display unit 30.

If there are a plurality of groups, all groups may be incapable of being displayed in one screen of the display unit 30. In this case, if a user inputs (for example, drags in up and down directions) to the touch panel on the represented image display area 100, the screen may be scrolled, and other group may be displayed as shown in FIG. 3B. In this way, the user can easily recognize all group with a seamless display. It should be noted that a scroll at this time may be a so-called inertia scroll.

Figure 4:
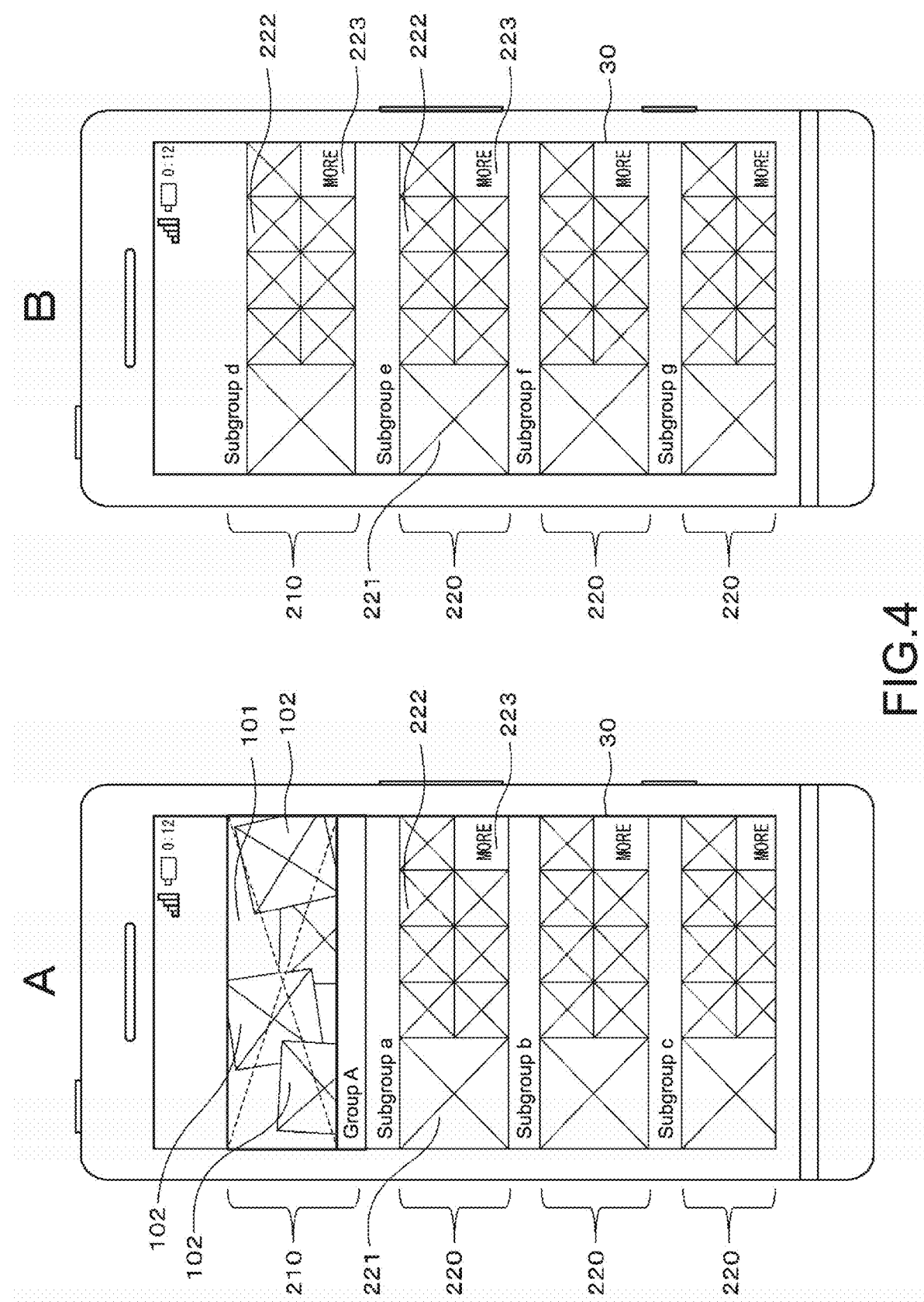
FIG. 4A is a diagram showing a display mode of a summary hierarchical display.
FIG. 4B is a diagram showing a display mode of a summary hierarchical display if a screen is scrolled.

Next, referring to FIG. 4, a summary hierarchical display will be described as the second hierarchical display. In the state that the represented image shown in FIG. 3 is displayed, if a user inputs (for example, taps) to select any group, the image display is switched to the summary hierarchical display.

The summary hierarchical display is to classify the images contained in the group for a summary display. In the state where the represented image is displayed, if the user selects any of the groups, the images contained in the group selected are displayed between the group selected and the group lower than the group selected. In FIG. 4A, the user selects the group A, and a plurality of the images contained in a subgroup a, a subgroup b, a subgroup c contained in the group A are displayed on the area between the group A and the group B. As shown in FIG. 4A, subgroup names (the "subgroup a", the "subgroup b", and the "subgroup c" in FIG. 4A) are displayed at positions corresponding to the respective subgroups.

The summary hierarchical display is a display mode including a header display area 210, and subgroup display areas 220, 220, . . . . The header display area 210 displays the group selected by the user in the represented image display at the uppermost column. In FIG. 4A, the represented image 101 and the related images 102 of the group A selected by the user are displayed as a header. By the display, the user can easily recognize that which group contains the image now displayed.

The subgroup display area 220 is to display the images contained in the subgroup being present in the group displayed in the represented image display. The subgroup display area 220 has a large size image display area 221 and a small size image display area 222, The large size image display area 221 is to display one image contained in the subgroup in a large size. The small size image display area 222 is to display and arrange a plurality of the images contained in the subgroup in smaller sizes as compared with the large size image display area 221. The subgroup display area 220 corresponds to the represented image display area in the claims.

In the embodiment shown in FIG. 4A, in the large size image display area 221, one image is displayed, and in the small size image display area 222, seven images are displayed. Note that the number of the images displayed in the small size image display area is only an example, and is not limited to seven. The display size may be decreased, and more images may be displayed. Oppositely, the display size may be increased, and less images may be displayed.

If the group contains a number of subgroups, all subgroups may not be displayed within one screen of the display unit 30. In this case, if the user inputs to the touch panel (for example, drags in up and down directions) on the subgroup display area 220, the screen may be scrolled to display other subgroups shown in FIG. 4B. In this way, the user can easily recognize all subgroups with a seamless display. A scroll at this time may be a so-called inertia scroll.

Figure 5:
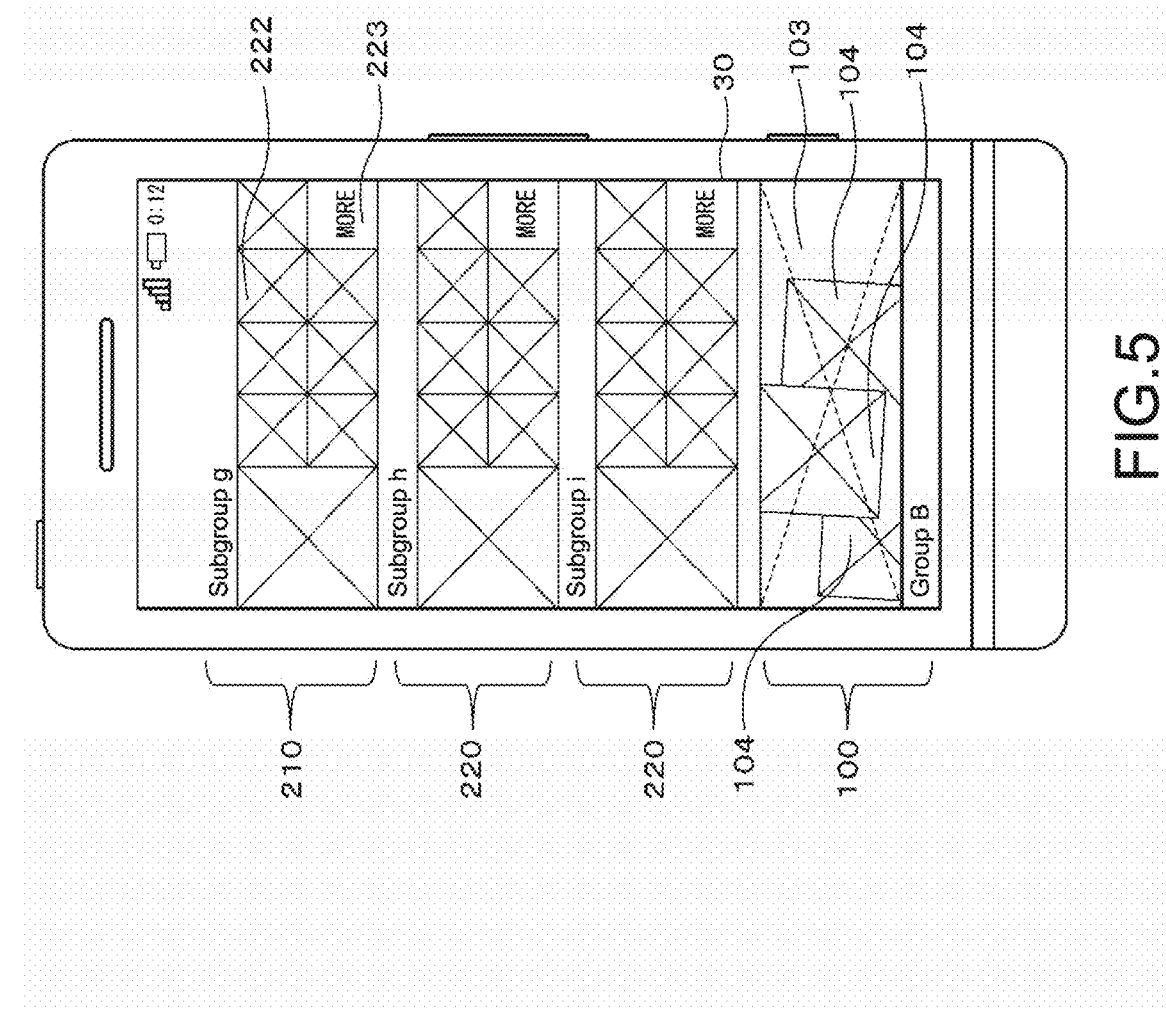
FIG. 5 is a diagram showing a display mode of a header display in a group displayed if a summary hierarchical display is scrolled.

The subgroup display area 220 is displayed between the group selected by the user in the state that the represented image is displayed and the group lower than the group, as described above. Accordingly, for example, if the group selected is the group A and the subgroup display area 220 of the group A is scrolled to down, the represented image of the group B, i.e., other group is displayed in a display format of a header area 100, as shown in FIG. 5. In FIG. 5, a represented image 103 of the group B is displayed as the background image. In addition, related images 104, 104, 104 are superimposed and displayed on the background image. With the seamless display, all groups and subgroups can be easily recognized without switching the screen to other screen. If the screen is scrolled, both of the header display area 210 and the subgroup display areas 220 may be scrolled. Alternatively, while the header display area 210 may be fixed, the subgroup display area 220s may be scrolled. FIG. 5 shows the case that both of the header display area 210 and the subgroup display areas 220 are scrolled.

Figure 6:
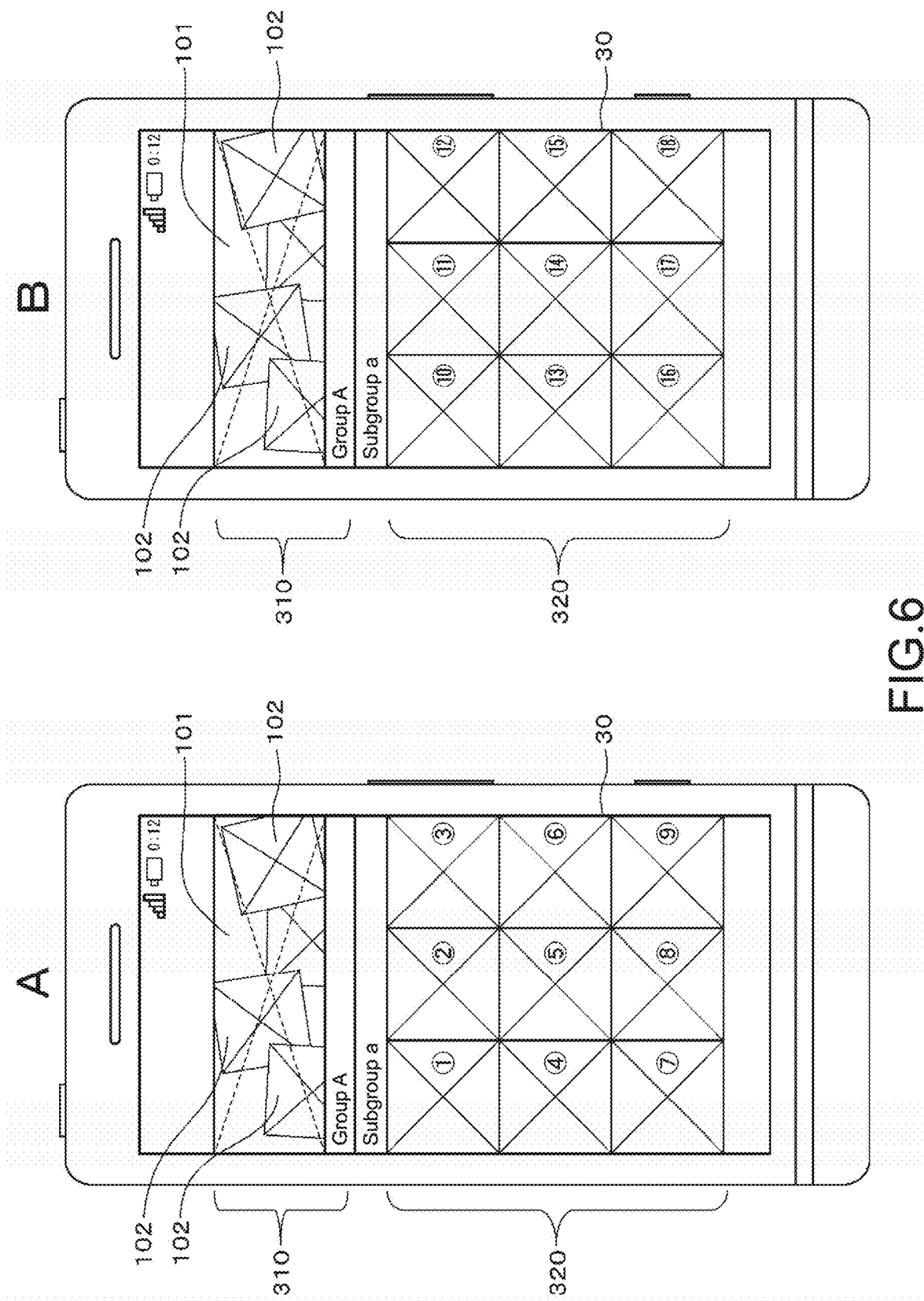
FIG. 6A is a diagram showing a display mode of a detailed hierarchical display.
FIG. 6B is a diagram showing a display mode of a detailed hierarchical display if a summary hierarchical display is scrolled.

Furthermore, in the summary hierarchical display, there is displayed a detailed display instruction button 223 to instruct switching to the detailed hierarchical display that displays the images contained in the subgroup, but not displayed on the summary hierarchical display. The detailed display instruction button 223 is present per subgroup displayed on the summary hierarchical display. The detailed display instruction button 223 is represented by "MORE" in FIG. 4. If the user inputs (for example, taps) the detailed display instruction button 223, the display is switched to the detailed hierarchical display, as shown in FIG. 6. Note that the display "MORE" of the detailed display instruction button 223 in FIG. 4 is only an example, and is not limited to the display mode of the detailed display instruction button 223.

Next, referring to FIG. 6, the detailed hierarchical display, i.e., the third hierarchical display will be described. As described above, in a summary hierarchical display state, if the user inputs (for example, taps) the display instruction button 223, the image display is switched to the detailed hierarchical display shown in FIG. 6A.

The detailed hierarchical display is to display the images contained in the subgroup corresponding to the display instruction button 223 inputted. The detailed hierarchical display is a display mode including a header display area 310 and a detailed display area 320. The header display area 310 is to display the group including the subgroup corresponding to the display instruction button 223 inputted by the user in the summary hierarchical display in the uppermost column of the display unit 30. In FIG. 6A, as the detailed display instruction button 223 of the subgroup a is inputted by the user, the represented image 101 and related images 102 of the group A including the subgroup a are displayed as the header. By the display, the user can easily recognize that which group contains the image now displayed.

The detailed image display area 320 is to display the images contained in the subgroup selected by the input of the user to the detailed display instruction button 223. In FIG. 6A, 3×3=9 images (images 1 to 9) are displayed. However, the number of display is not limited thereto.

It should be noted that if the subgroup contains a number of images, all images contained in the subgroup cannot be displayed on one screen of the display unit 30. In this case, if the user inputs (for example, drags in up and down directions) to the touch panel on the detailed display area 320, the screen may be scrolled, and other group may be displayed as shown in FIG. 6B. In this way, the user can easily recognize all images contained in the subgroup. It should be noted that a scroll at this time may be a so-called inertia scroll.

Figure 7:
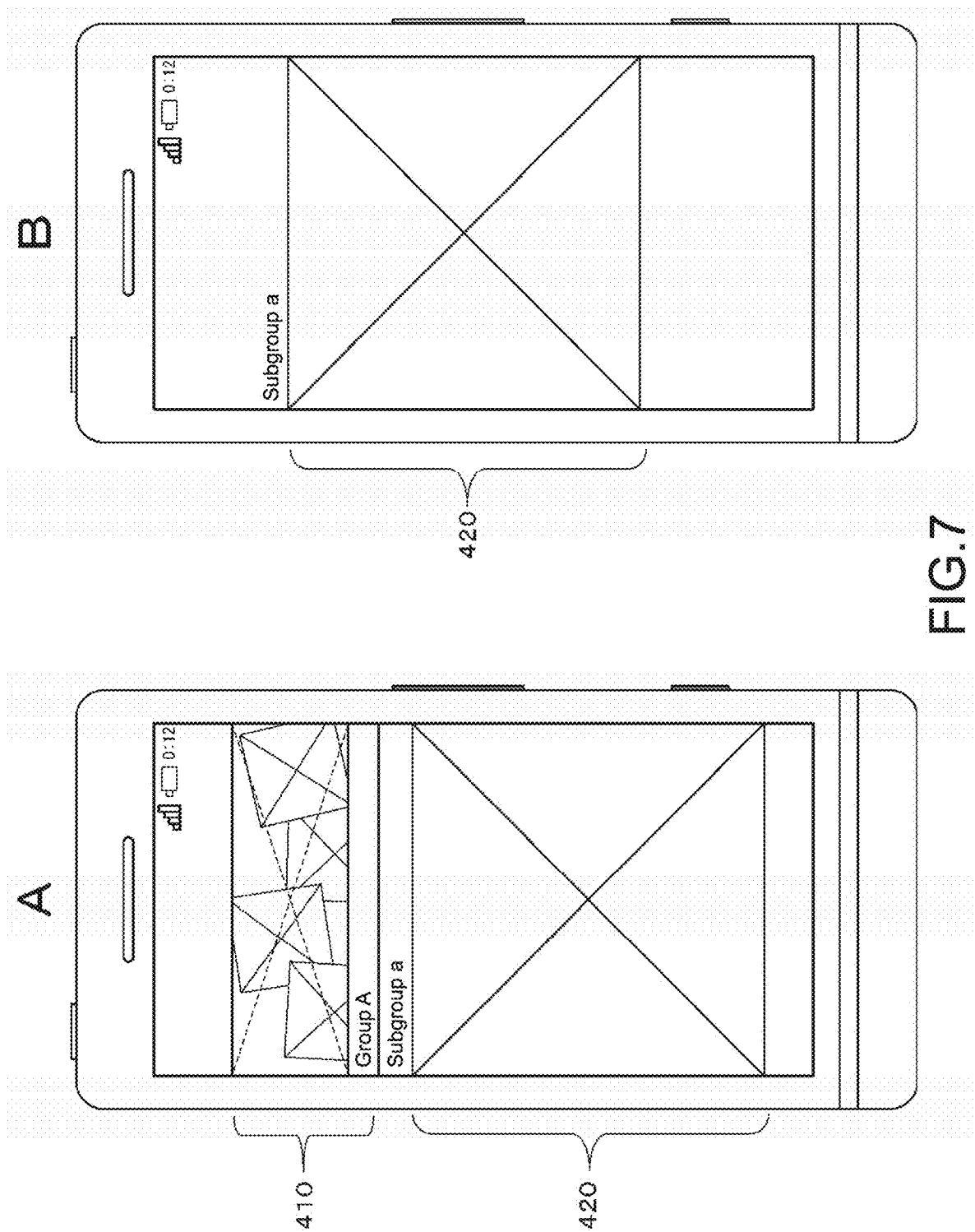
FIG. 7A is a diagram showing a first embodiment of an image single display.
FIG. 7B is a diagram showing a second embodiment of an image single display.

In the summary hierarchical display and the detailed hierarchical display, if the user inputs (for example, taps) to a specific image, the display control unit 12 singly display the image as shown in FIG. 7. The single display includes a header display area 410 and a single display area 420.

By singly displaying the image, the user can browse an image requested in a large display state. If the image is singly displayed, the represented image of the group to which the image belongs may be displayed on the header display area 410 as shown in FIG. 7A, or only the single display area 420 may be displayed as shown in FIG. 7B.

Figure 8:
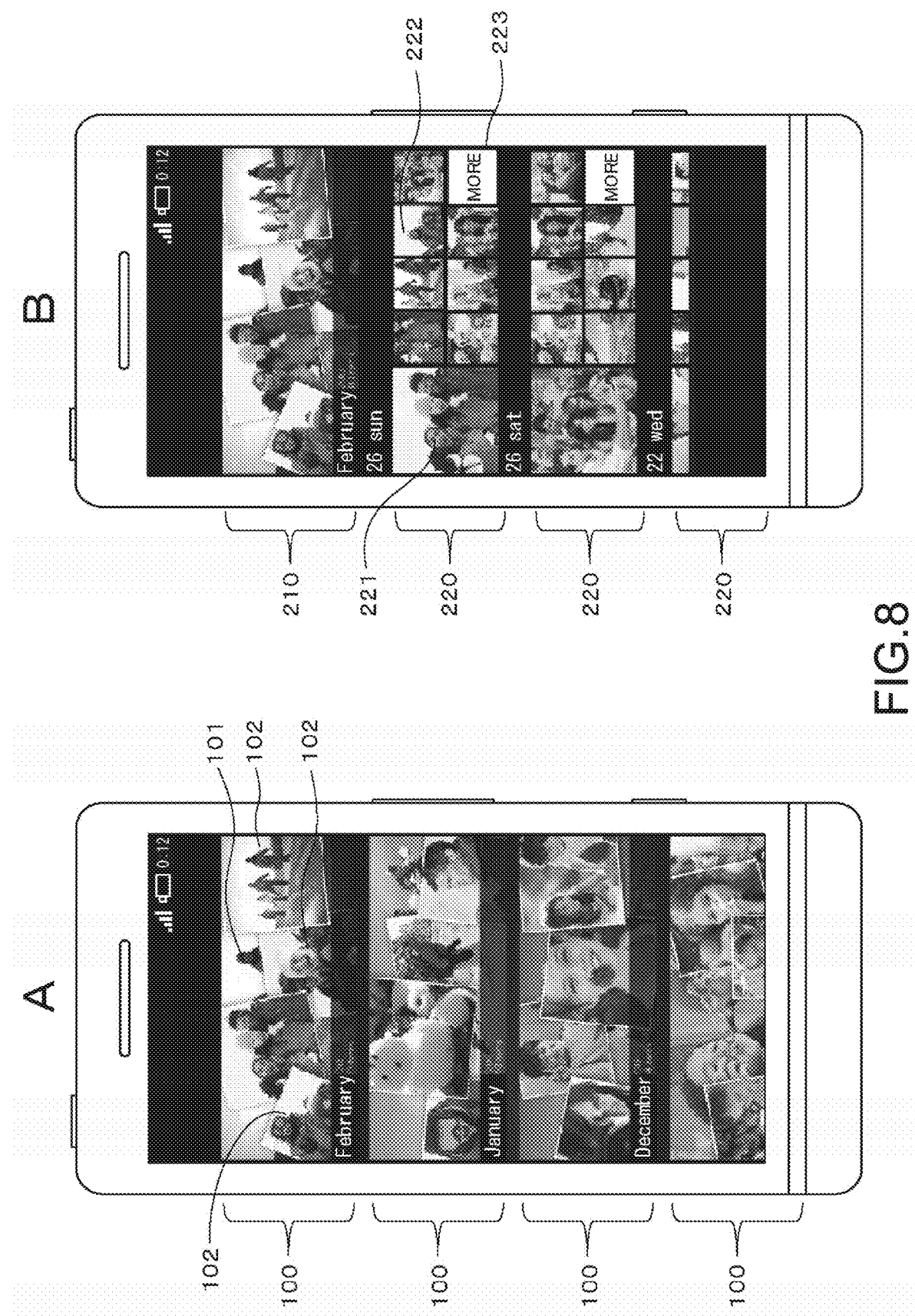
FIG. 8A is a diagram showing a display example of a represented image display using a specific image classified in an "import time" category.
FIG. 8B is a diagram showing a display example of a summary hierarchical display using a specific image classified in an "import time" category.
Figure 9:
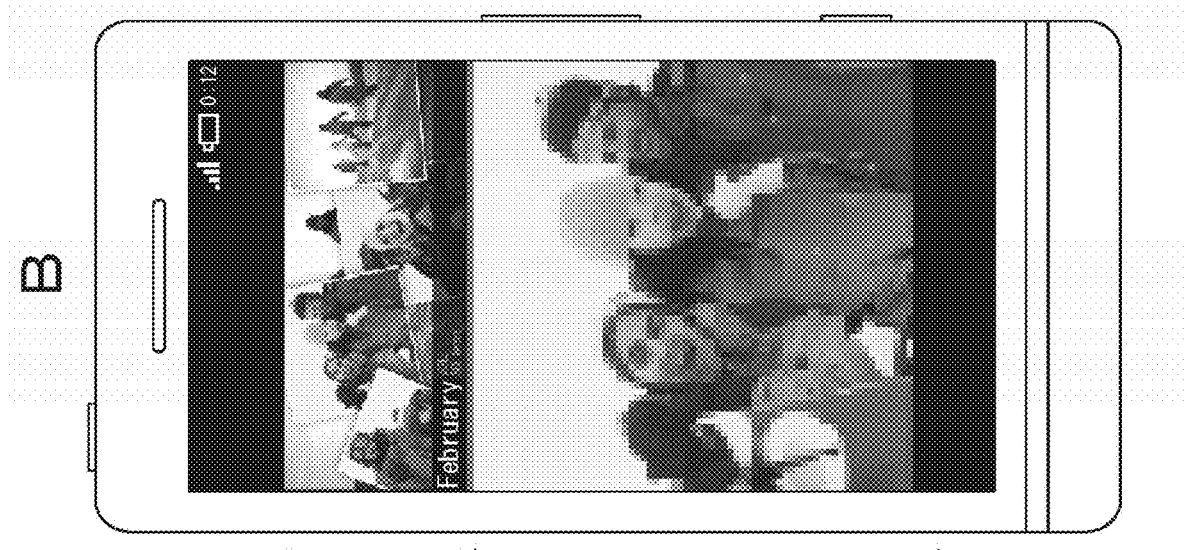
FIG. 9A is a diagram showing a display example of a detailed hierarchical display using a specific image classified in an "import time" category.
FIG. 9B is a diagram showing a display example of an image single display using a specific image classified in an "import time" category.
Figure 9:
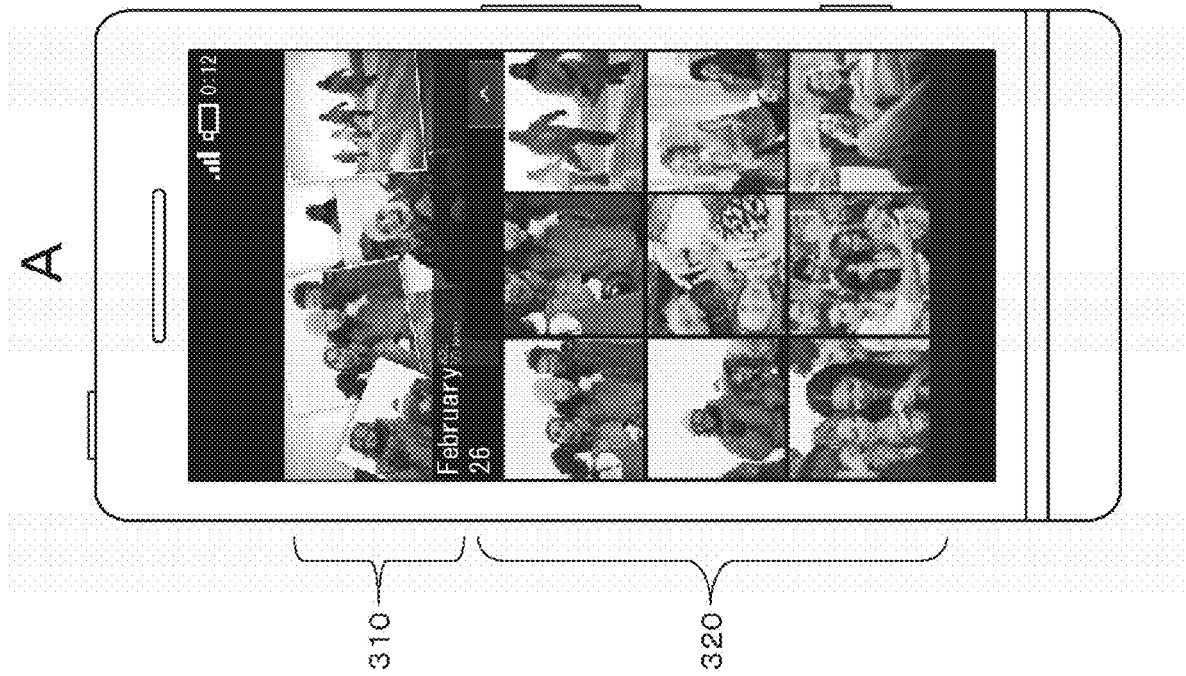

FIG. 8 and FIG. 9 display the display modes of the above-described represented image display, summary hierarchical display, detailed hierarchical display, enlarged image display and single image display using specific images. FIG. 8 and FIG. 9 are examples if a category is an "import time".

In the represented image display in FIG. 8A, the group is a "month", and February, January and December are shown. For example, the represented image 101 is displayed on the represented image display area 100 at the uppermost column, and a plurality of represented images 102 are displayed on the represented image 101. The same shall apply to other represented image display areas 100. In the state where the represented image is displayed, once an input to select any group is made, the display is switched to the summary hierarchical display, as shown in FIG. 8B.

FIG. 8B shows the summary hierarchical display if the group February is selected. In the summary hierarchical display, the images contained in the subgroup contained in the group February are displayed in the subgroup display areas 220. If the group is a "month", the subgroup is a "day" for example. In the embodiment shown in FIG. 8B, three subgroups "26$^{th}$", "25$^{th}$" and "22$^{th}$" are shown.

In the subgroup display area 220, one image is displayed on the large size image display area 221, and seven images are displayed on the small size image display area 222. In addition, the detailed display instruction button 223 denoting "MORE" is displayed.

In the summary hierarchical display, if an input to the detailed display instruction button 223 is made, the display is switched to the detailed hierarchical display shown in FIG. 9A. FIG. 9A is the detailed hierarchical display if the subgroup "26$^{th}$" is selected. In the detailed hierarchical display, the represented image showing the selected group is displayed on the header display area 310. In addition, the image contained in the group "26$^{th}$" is arranged and displayed on the detailed display area 320.

In the summary hierarchical display shown in 8B and the detailed hierarchical display shown in FIG. 9A, if an input to select a specific image is made, the image selected is enlarged as shown in 9B.

Figure 10:
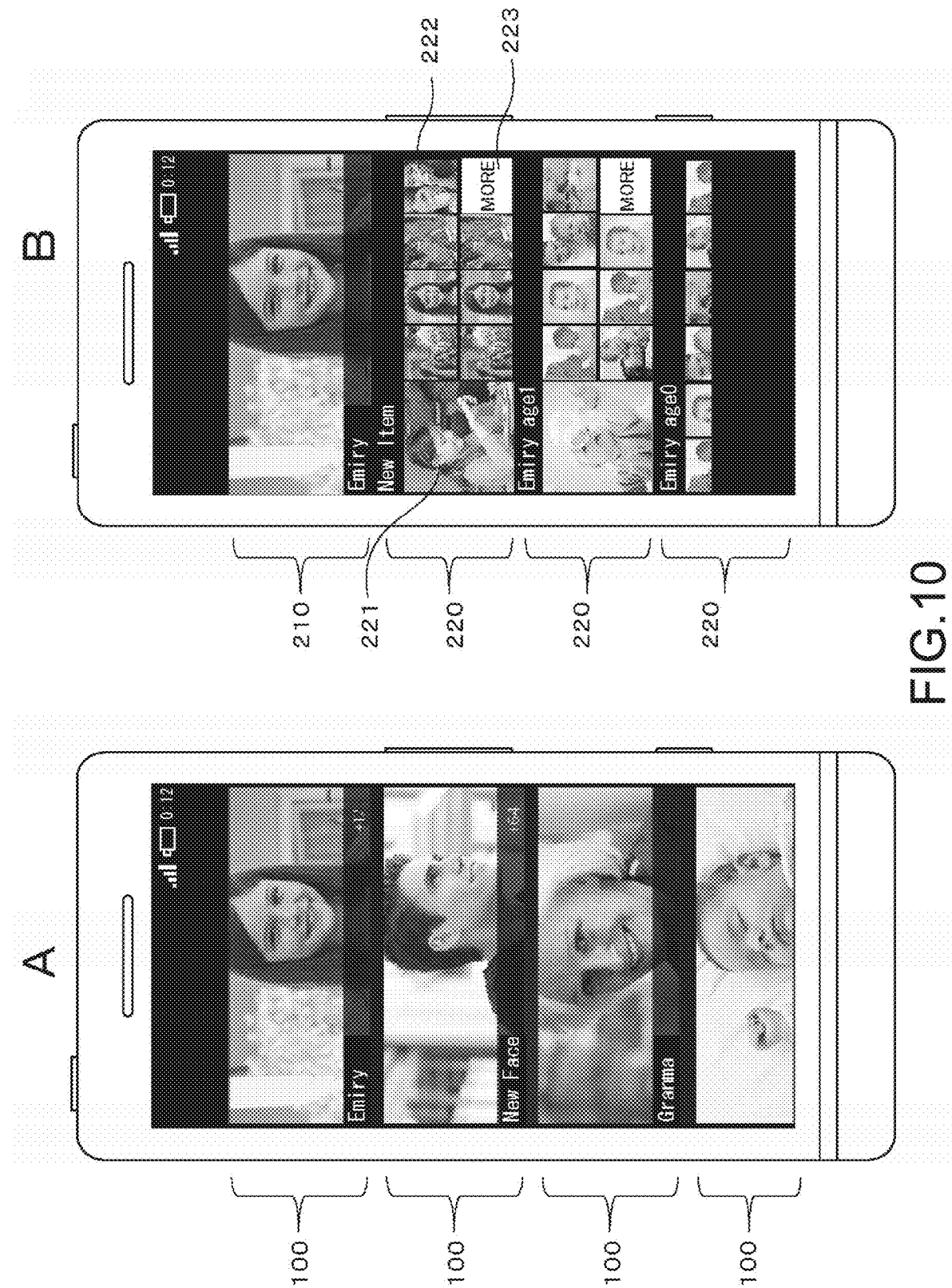
FIG. 10A is a diagram showing a display example of a represented image display using a specific image classified in a "main photographic subject" category.
FIG. 10B is a diagram showing a display example of a summary hierarchical display using a specific image classified in a "main photographic subject" category.
Figure 11:
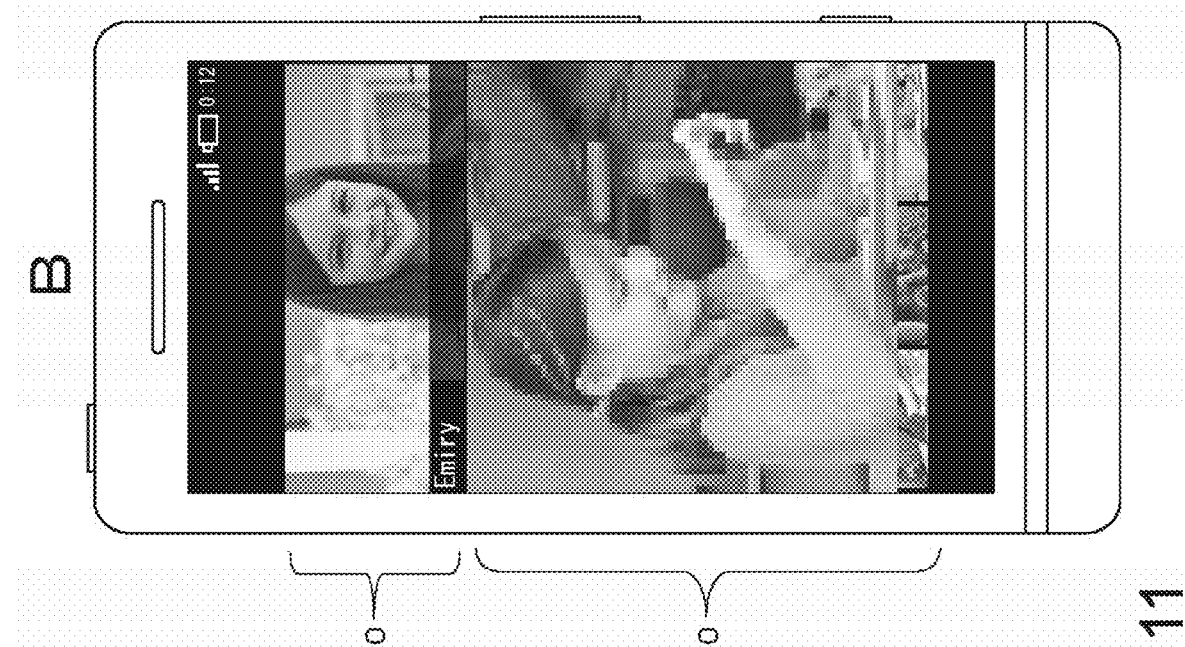
FIG. 11A is a diagram showing a display example of a detailed hierarchical display using a specific image classified in a "main photographic subject" category.
FIG. 11B is a diagram showing a display example of an image single display using a specific image classified in a "main photographic subject" category.
Figure 11:
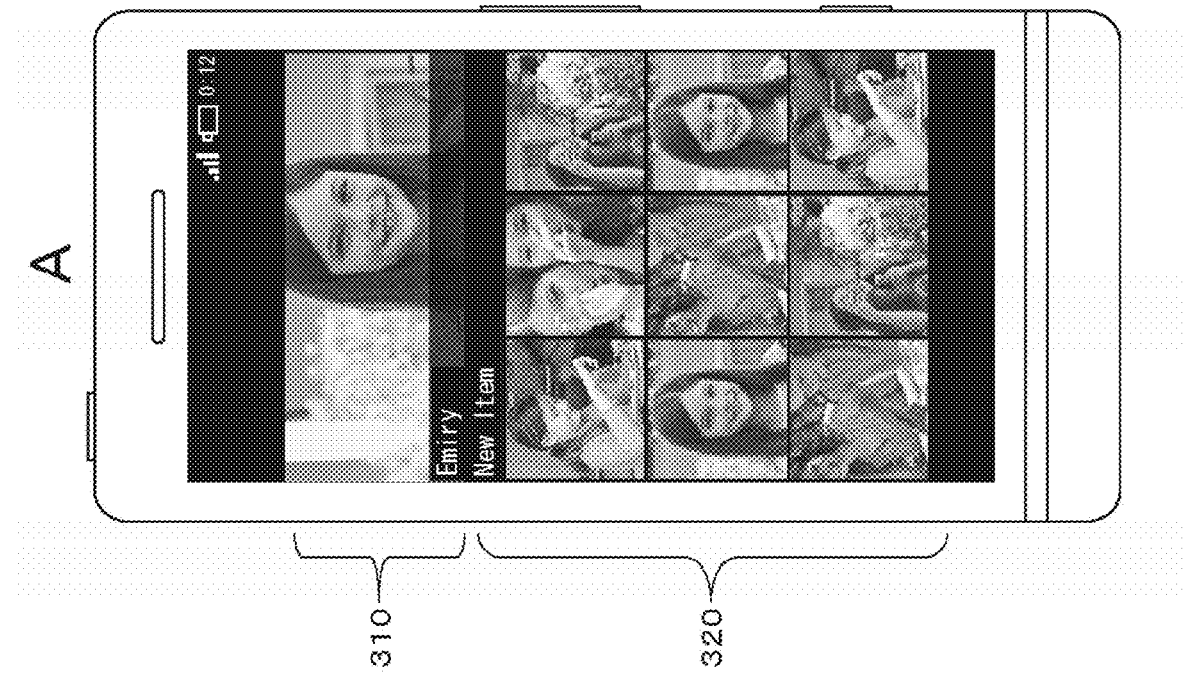
Figure 12:
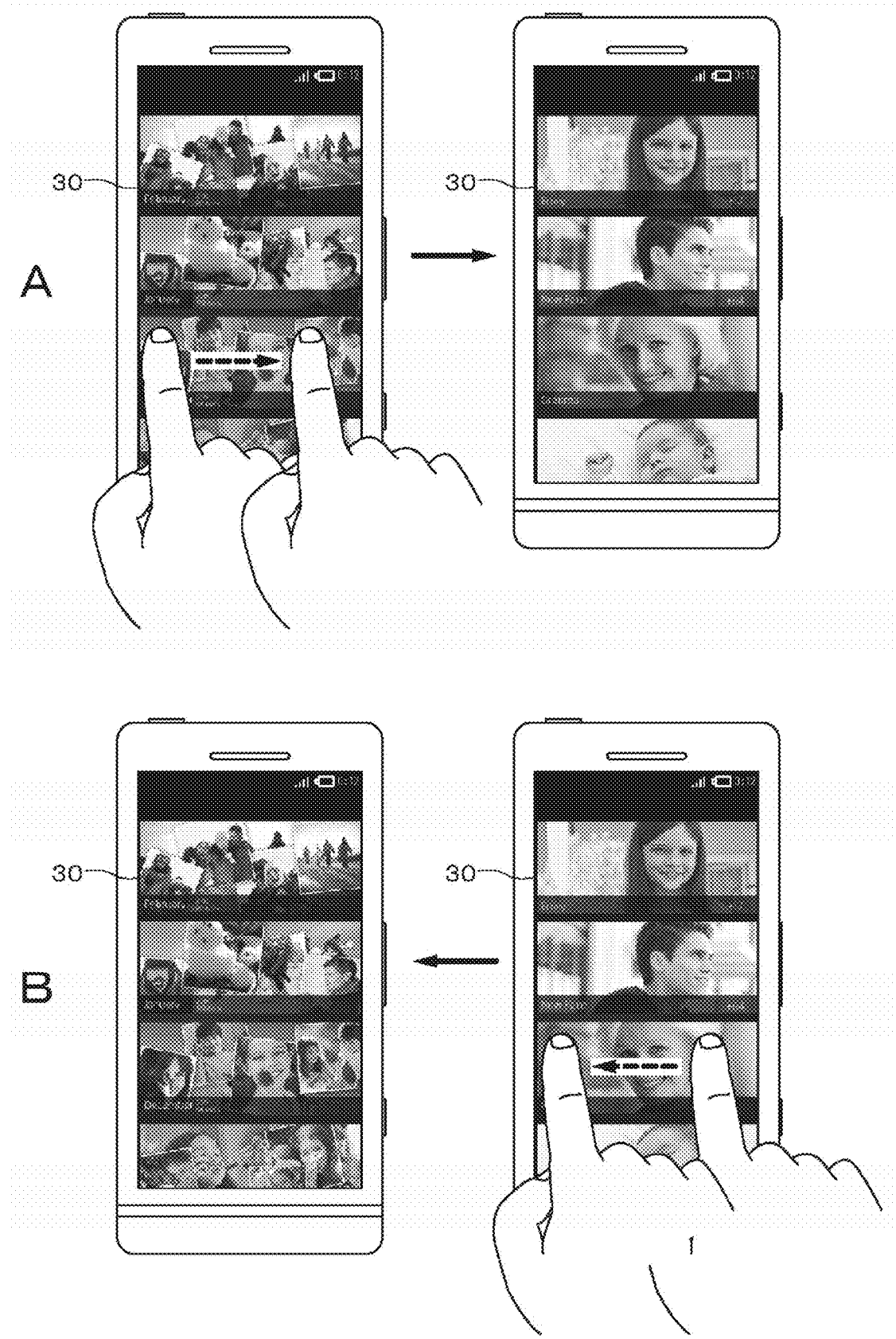
FIG. 12A is a diagram explaining a switching of category displays.
FIG. 12B is a diagram explaining a switching of category displays.

FIG. 10 and FIG. 11 show display mode examples in the "main photographic subject" category. In the represented image display in the "main photographic subject" category, the images are grouped per person who is the photographic subject, and the represented image of each group is displayed together with the name of the person. The represented image of the group is displayed by scoring the images contained in the group and selecting the image having a highest score, as described above. The images may be grouped by recognizing a person in the image saved in a storage unit of a smartphone by the image display apparatus using a known photographic subject recognition technique, and by automatically setting the group per person.

Thus, in the first hierarchical represented image display of the "main photographic subject" category, the person group is displayed by using the represented image, thereby recognizing which group of the photographic subject at a glance.

In the represented image display shown in FIG. 10A, if an input to select a specific group is performed, the display is switched to the summary hierarchical display, as shown in FIG. 10B. FIG. 10B is a summary hierarchical display if a group Emiry shown in FIG. 10A is selected.

If the category is the "main photographic subject", the subgroup is an age of the main photographic subject, for example. In the embodiment shown in FIG. 10B, the group Emiry is selected, and the images of the girl Emiry are displayed as the subgroups by age. If the category is the main photographic subject, the subgroup "New items" where new images added within a predetermined period before now may be formed. In the "main photographic subject" category, the images are classified into the subgroups by recognizing the time of capturing the images provided by referring the image import time and EXIF data.

In the summary hierarchical display, if an input to the detailed display instruction button 223 is made, the display is switched to the detailed hierarchical display as shown in FIG. 11A. FIG. 11A is the detailed hierarchical display if the subgroup "New items" is selected. In the detailed hierarchical display, the images contained in the subgroup "New items" are arranged and displayed on the detailed display area 320.

In the summary hierarchical display shown in FIG. 10B and the detailed hierarchical display shown in FIG. 11A, if an input to select a specific image is made, the selected image is enlarged as shown in FIG. 11B.

In this manner, the three display modes, the represented image display, the summary hierarchical display, and the detailed hierarchical display are switched. If a button for instructing a switch to a high hierarchy is disposed and is an input to the button is made, the display may be switched to the high hierarchy, e.g., from the detailed hierarchical display to the summary hierarchical display, or from the summary hierarchical display to the represented image display.

Next, a category switching will be described. Firstly, the category switching in the represented image display as the first hierarchical display will be described. The display control unit 12 switches the first hierarchical display in the state where the represented image is displayed to other category in the state where the represented image is displayed if a user inputs (for example, flicks in a horizontal direction) to the display unit 30 as the touch panel, as shown in FIG. 12.

In the embodiment shown in FIG. 12, if the flick operation is performed from left to right as shown in FIG. 12A, the display is switched from the "import time" category to the "main photographic subject" category. On the contrary, if the flick operation is performed from right to left as shown in FIG. 12B, the display is switched from the "main photographic subject" category to the "import time" category.

The same shall apply to a switch to other category such as the "event" category. Thus, by switching the category, an instinctive category switching is possible.

Next, a category switching in the summary hierarchical display as the second hierarchical display will be described. In the summary hierarchical display, a large size image display and a small size image display are provided in the subgroup display. In this state, if a user inputs as predetermined to a specific image, it switches to the category tagged to the specific image. For example, in the summary hierarchical display of the "import time" category, if an input to instruct a category switching to a girl image is performed, the display is switched to the "main photographic subject" category of the girl.

There are a variety of input methods to instruct the category switching. For example, as one of the input method, a finger is toughed to an image displayed to flick to right or left direction from the position. In addition, as one of the input method, a double-tap operation is performed on any image. Furthermore, as one of the input method, a button for selecting an image is disposed, a finger is contacted with the button for selecting an image to change into an image selection mode, and a tap operation is performed on any image.

Thus, by switching the category, if the image is seen in the "import time" category and the image to be interested is found, the image relating to the image to be interested can be easily seen. In this way, an image can be searched conveniently.

As described above, the display control apparatus 10 is configured. Processing functions of the display control apparatus 10 can be achieved by a variety of devices such as a computer. In this case, there is provided a program where processing contents of the functions that the display control apparatus 10 should have are described. By executing the program on the device, the above-described processing functions are achieved on the device.

The program where the processing contents are described can be recorded on a computer-readable recording medium such as an optical disk and a semiconductor memory. The recording medium can be sold/distributed as package software. Also, the program is stored in a server, which can be sold/distributed via a network.

A variety of devices for executing the program stores the program stored in the storing medium or the program transferred from the server to an own storing apparatus, for example. Then, the device reads the program from the own storing apparatus, and executes processing in accordance with the program. Also, the program may be installed to a memory of a control unit of the device, and executed.

Also, the device can read the program directly from the recording medium, and execute the processing in accordance with the program. Furthermore, the device can successively execute the processing in accordance with the program received every time the program is transferred from the server.

It should be noted that the display control apparatus 10 is not only achieved by the program, but also may be achieved by combining dedicated apparatuses having hardware having the respective functions.

The processing by the display control apparatus 10 may be provided to the user by a so-called cloud service. The cloud service is provided by a server present on a network, and is one of computer utilization based on the Internet. All necessary processing is done basically on the server. A user saves data not on own personal computer, smartphone or mobile phone, but on the server of the Internet. Therefore, the service can be used and the data can be browsed, edited or uploaded in a variety of environments including a house, an office, an internet cafe, a school and outside.

By saving images on the cloud, displaying the images by the image processing apparatus 10 on the cloud, and transmitting data showing the display mode and the image data to a user's device, it is possible to browse the images in a variety of environments. Alternatively, the images may be saved on cloud, and the display processing by the image processing apparatus 10 may be performed on the user's device.

[1-2. Processing in Display Control Apparatus]

Figure 13:
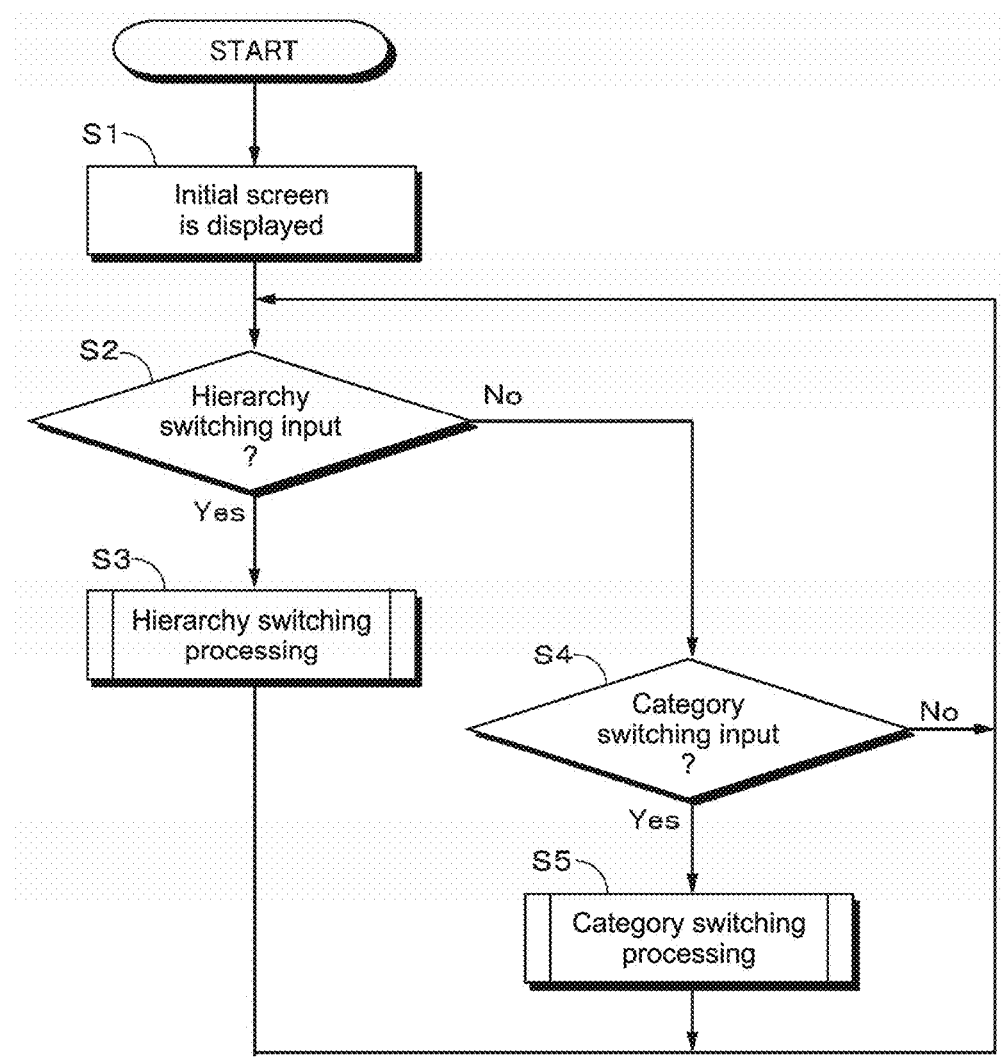
FIG. 13 is a flowchart showing overall flows of processing in a display control apparatus.

Next, processing in the display control apparatus 10 will be described. FIG. 13 is a flowchart showing overall flows of processing in the display control apparatus 10. This processing is performed by the display control unit 12 of the display control apparatus 10. Note that images are already classified by the image classification unit 11.

Firstly, in step S1, an initial screen is displayed on the display unit 30. As the initial screen, a predetermined screen (for example, the represented image display of the "import time" category) is displayed if the display is done by the display control apparatus 10 for the first time. If there is a history that the display was done by the display control apparatus 10 in the past, a last memory function may be used to display the screen previously displayed as the initial screen.

Next, in step S2, it is determined whether or not the input to instruct a hierarchy switching by a user is done. The input to instruct the hierarchy switching is an input (for example, a tap operation) to select any group in the state where the represented image is displayed, as described above. In the case of the summary hierarchical display, an input (for example, a tap operation) to the detailed display instruction button 223 or an input (for example, a tap operation) to select a specific image.

If the user inputs to instruct the hierarchy switching, the processing proceed to step S3 (Yes in step S2). In step S3, the hierarchy switching processing is done. A flow of the hierarchy switching processing will be described below referring to FIG. 14.

Figure 15:
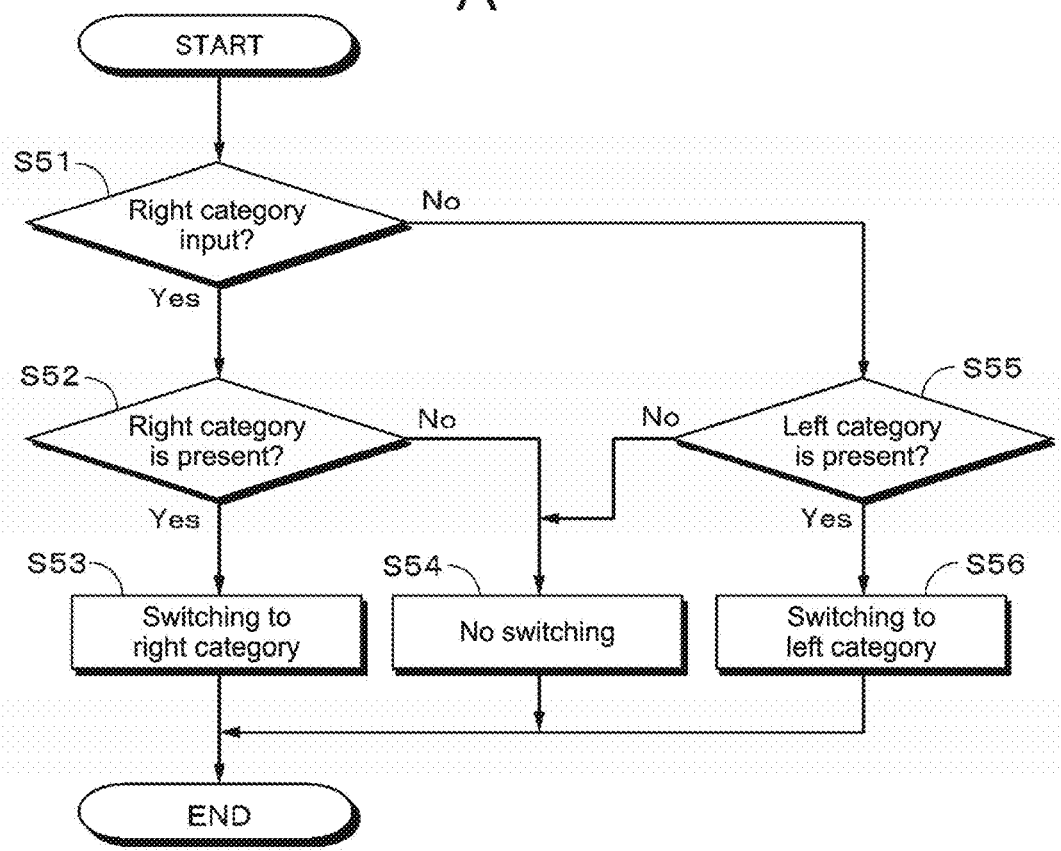
FIG. 15A is a flowchart showing a flow of a category switching processing.
FIG. 15B is a alternative flowchart showing a flow of a category switching processing.
Figure 15:
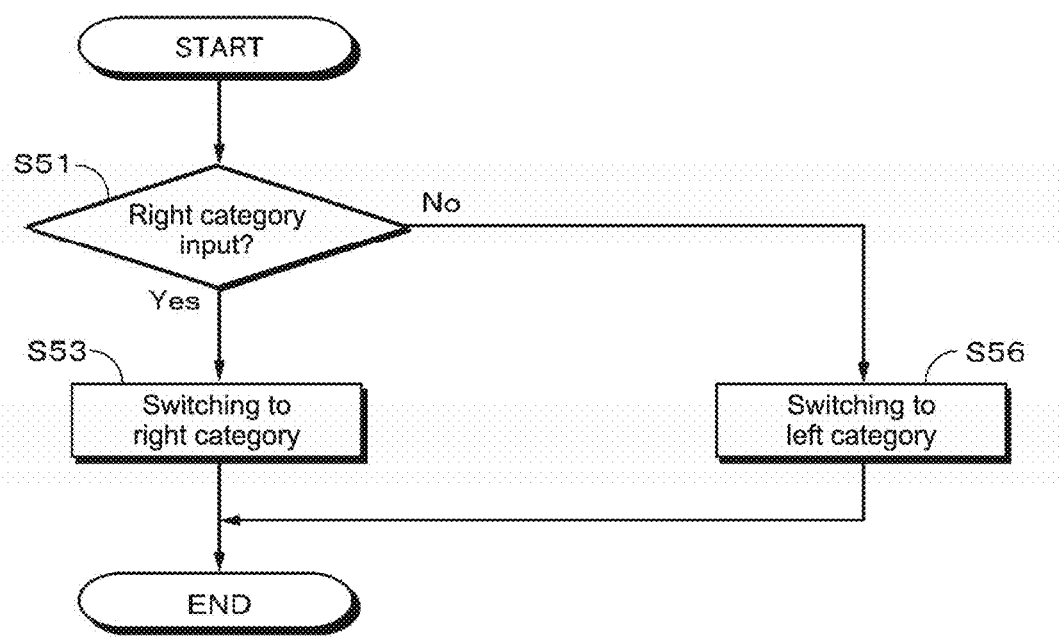

Meanwhile, if it is determined that no input to instruct the hierarchy switching is done in step S2, the processing proceeds to step S4 (No in step S3). Next, in step S4, it is determined whether or not the input to instruct the category switching is done. If the category switching is done, processing proceeds to step S5 (Yes in step S4). Then, in step S5, the category switching processing is done. A flow of the category switching processing will be described below referring to FIG. 15.

If no input to instruct the category switching is done, the processing proceeds to step S2 to determine again whether or not the user inputs. Note that the order of the determination whether or not the input to instruct the category switching is done and the determination whether or not the input to instruct the category switching is done is not limited to that shown in the flowchart in FIG. 13, and may be reversed.

Figure 14:
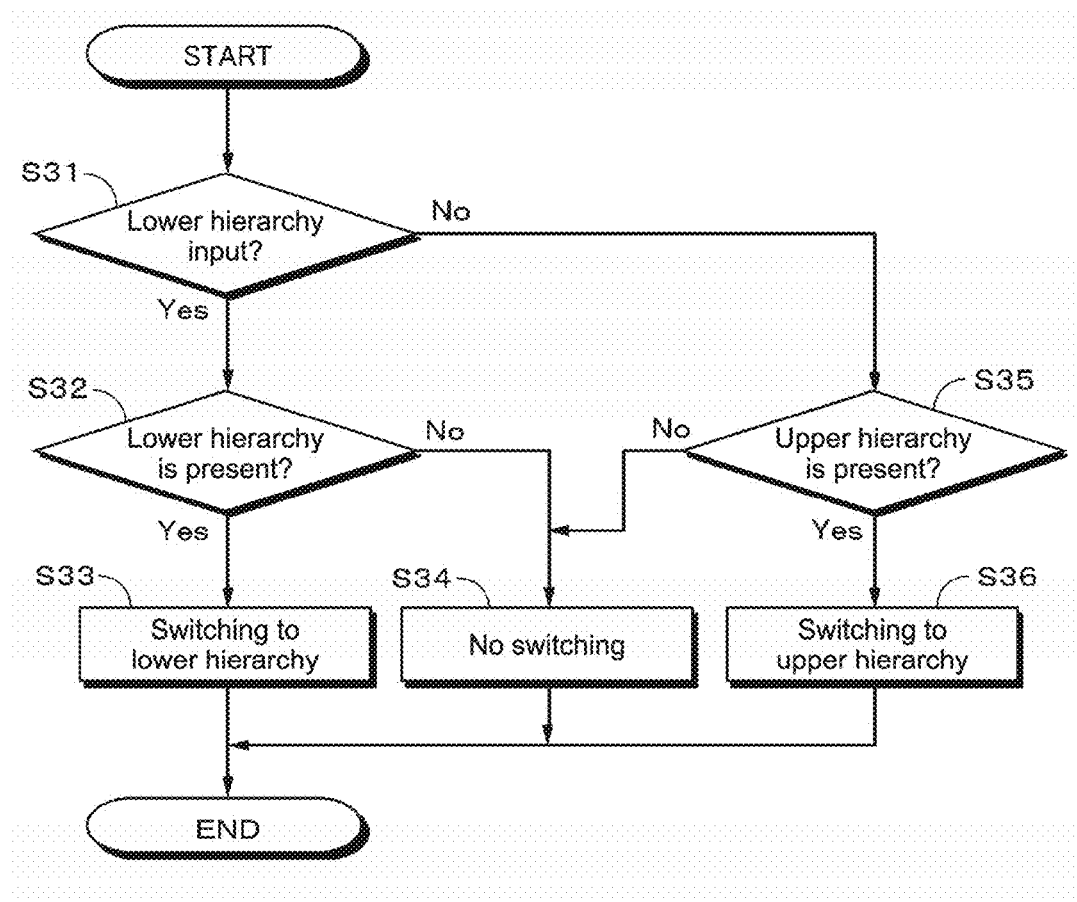
FIG. 14 is a flowchart showing a flow of a hierarchical switching processing.

Next, the flow of the hierarchy switching processing will be described below referring to FIG. 14. FIG. 14 is a flowchart showing a flow of the hierarchy switching processing. Firstly, in step S31, it is determined whether or not the input to instruct the hierarchy switching by the user is to instruct a switching to a lower hierarchy. If the represented image display is currently displayed, the lower hierarchy is the summary hierarchical display. If the summary hierarchical display is currently displayed, the lower hierarchy is the detailed hierarchical display.

If the input to instruct the switching to the lower hierarchy is done by the user, the processing proceeds to step S32 (Yes in step S31). Next, in step S32, it is determined whether or not the lower hierarchy is present. If the represented image display is currently displayed, the lower hierarchy is the summary hierarchical display. Therefore, it is determined that the lower hierarchy is present. If the summary hierarchical display is currently displayed, the lower hierarchy is the detailed hierarchical display. Therefore, it is determined that the lower hierarchy is present. On the other hand, if the detailed hierarchical display is currently displayed, it is determined that no lower hierarchy is present.

If the lower hierarchy is present, the processing proceeds to step S33 (Yes in step S32). Then, in step S33, the switching processing to the lower hierarchy is done. If the represented image display is currently displayed, it switches to the summary hierarchical display. If the summary hierarchical display is currently displayed, it switches to the detailed hierarchical display.

On the other hand, if no lower hierarchy is present in step S32, the processing proceeds to step S34 (No in step S32). In this case, although the input to instruct the switching to the lower hierarchy is done, no lower hierarchy is present. Therefore, the switching processing is not done.

The description returns to step S31. If the user input is not to instruct the switching to the lower hierarchy, the processing proceeds to step S35 (No in step S31). The user input is not to instruct the switching to the lower hierarchy, which means to instruct the switching to an upper hierarchy. Next, in step S35, it is determined whether or not the upper hierarchy is present. If the detailed hierarchical display is currently displayed, the upper hierarchy is the summary hierarchical display. Therefore, it is determined that the upper hierarchy is present. If the summary hierarchical display is currently displayed, the upper hierarchy is the represented image display. Therefore, it is determined that the upper hierarchy is present. On the other hand, if the represented image display is currently displayed, it is determined that no upper hierarchy is present.

If the upper hierarchy is present, the processing proceeds to step S36 (Yes in step S35). Then, in step S35, the switching processing to the upper hierarchy is done. If the detailed hierarchical display is currently displayed, it switches to the summary hierarchical display. If the summary hierarchical display is currently displayed, it switches to the represented image display.

On the other hand, if no upper hierarchy is present in step S35, the processing proceeds to step S34 (No in step S35). In this case, although the input to instruct the switching to the upper hierarchy is done, no upper hierarchy is present. Therefore, the switching processing is not done.

As described above, the hierarchy switching processing is done by the display control unit 12.

Next, referring to a flowchart of FIG. 15A, a flow of the category switching processing by the display control unit 12 will be described. FIG. 15A is a flowchart showing a flow of a category switching processing.

As described referring to FIG. 2, the hierarchical display has a relationship in a vertical direction, and the category has a relationship in a horizontal direction. The input to instruct the category switching by the user is done by the flick operation in the horizontal direction, for example. Then, the relationship of the category is taken in the horizontal direction, and the input to instruct the category switching by the user is taken as the switching to a left category or the switching to a right category.

Hereinafter, the description is based on an example that there are three categories of the "import time", the "main photographic subject" and the "event" from left in the order. Note that this is only example for description, and the types of the category and the arrangement of the category are not limited thereto.

Firstly, in step S51, it is determined whether or not the input to instruct the category switching by the user is to instruct the switching to the right category. If the "import time" category is currently displayed, the right category is the "main photographic subject" category. If the "main photographic subject" category is currently displayed, the right category is the "event" category.

If the user inputs to instruct the switching to the right category, the processing proceeds to step S52 (Yes in step S51).

Next, in step S52, it is determined whether or not the right category is present. If the "import time" category is currently displayed, the right category is the "main photographic subject" category. Therefore, it is determined that the right category is present. If the "main photographic subject" category is currently displayed, the right category is the "event" category. Therefore, it is determined that the right category is present. On the other hand, if the "event" category is currently displayed, it is determined that no right category is present.

If the right category is present, the processing proceeds to step S53 (Yes in step S52). Then, in step S53, the switching processing to the right category is done. If the "import time" category is currently displayed, it switches to the "main photographic subject" category. If the "main photographic subject" category is currently displayed, it switches to the "event" category.

On the other hand, if no right category is present in step S52, the processing proceeds to step S54 (No in step S52). In this case, although the input to instruct the switching to the right category is done, no right category is present. Therefore, the switching processing is not done.

The description returns to step S51. If the user input is not to instruct the switching to the right category, the processing proceeds to step S55 (No in step S51). The user input is not to instruct the switching to the right category, which means to instruct the switching to a left category.

Next, in step S55, it is determined whether or not there is a left category is present. If the "event" category is currently displayed, the left category is the "main photographic subject" category. Therefore, it is determined that the left category is present. If the "main photographic subject" category is currently displayed, the left category is the "import time" category. Therefore, it is determined that the left category is present. On the other hand, if the "import time" category is currently displayed, it is determined that no left category is present.

If the left category is present, the processing proceeds to step S56 (Yes in step S55). Then, in step S55, the switching processing to the left category is done. If the "event" category is currently displayed, it switches to the "main photographic subject" category. If the "main photographic subject" category is currently displayed, it switches to the "import time" category.

On the other hand, if no left category is present in step S55, the processing proceeds to step S54 (No in step S55). In this case, although the input to instruct the switching processing to the left category is done, no left category is present. Therefore, the switching is not done. Note that the categories may be arranged to be looped in the horizontal direction. In this case, if the categories are arranged as the "import time", the "main photographic subject" and the "event" from left, for example, a right side of the "event" is the "main photographic subject". A left side of the "import time" is the "event". In this case, the categories are always present at both of right and left sides. Therefore, if the input to instruct the switching to the right category, as shown in the flowchart in FIG. 15B, the switching to the right category is done. If the input to instruct the switching to the left category, the switching to the right category is done. Note that, in step S51 in FIG. 15B, it is not determined whether or not the input to instruct the switching to the right category is done, but it is determined whether or not the input to instruct the switching to the left category is done. In this case, step S53 will be replaced with step S56.

As described above, the category switching processing is done by the display control unit 12. According to the present technology, the images are classified into the categories based on the related information, and further classified into groups and subgroups. The groups and subgroups are displayed in three hierarchies of the summary hierarchical display, the summary hierarchical display, and the detailed hierarchical display. In this way, a searching ability and visibility of the images are improved, and the user can easily search the images and recognize the relationship between the images. In the hierarchical display, as the headers that function as indices are displayed in the respective hierarchies, the user can easily recognize that which group or which subgroup is currently displayed. Furthermore, in the hierarchical display, the image is divided and displayed so as to decrease a dot size of the image, whereby the user can easily find the image to be searched.

As the user can switch the categories in parallel by the flick operation, the categories can be easily switched without through a menu display operation.

<2. Alternative Embodiment>

While the embodiments according to the present technology is specifically described, the present technology is not limited to the above-described embodiments, and a variety of modifications may be made based on the technical spirit of the present technology.

Figure 16:
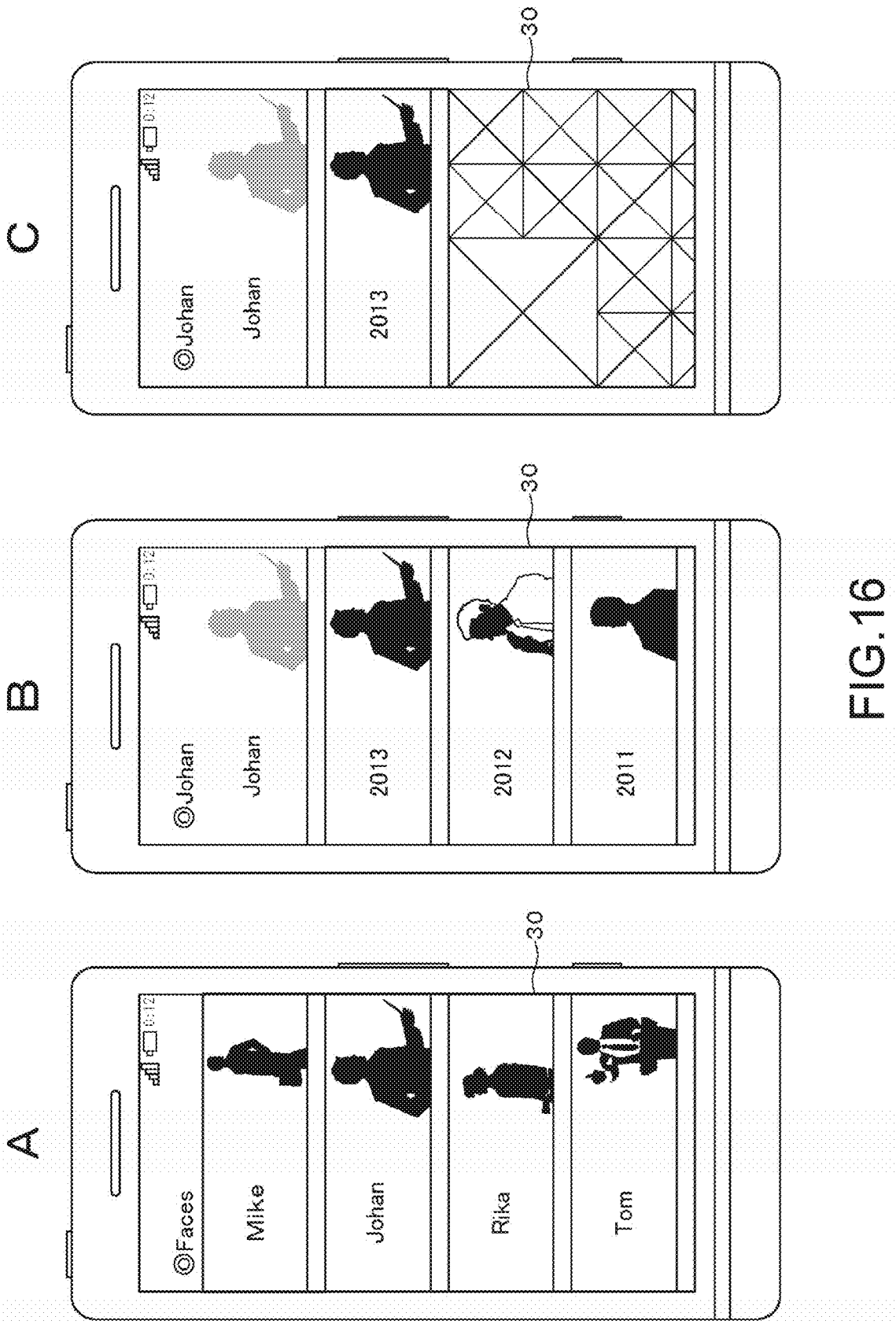
FIG. 16A to FIG. 16C each is a diagram showing a first alternative embodiment of a display according to the present technology.

FIG. 16 shows a first alternative embodiment of an image display mode according to the present technology. FIG. 16A is a represented image display in the "main photographic subject" category. In FIG. 16A, four groups of Mike, Johan, Rika, and Tom are shown. If a user selects Johan form the group, the display is switched to the state shown in FIG. 16B.

In the display state shown in FIG. 16B, dates 2013, 2012, and 2011 are displayed as the subgroups in the group "Johan". The display mode is similar to the represented image display. If a user selects 2013 from the groups, the display is switched to the state shown in FIG. 16C.

In the display state shown in FIG. 16C, the images included in the group "2013" selected are shown in the mode of the summary hierarchical display. All images displayed here are based on the photographic subject John and were captured in 2013. In this manner, the image may be displayed in the display mode different from the hierarchical displays such as the represented image display, the summary hierarchical display, and the detailed hierarchical display in the embodiment.

Figure 17:
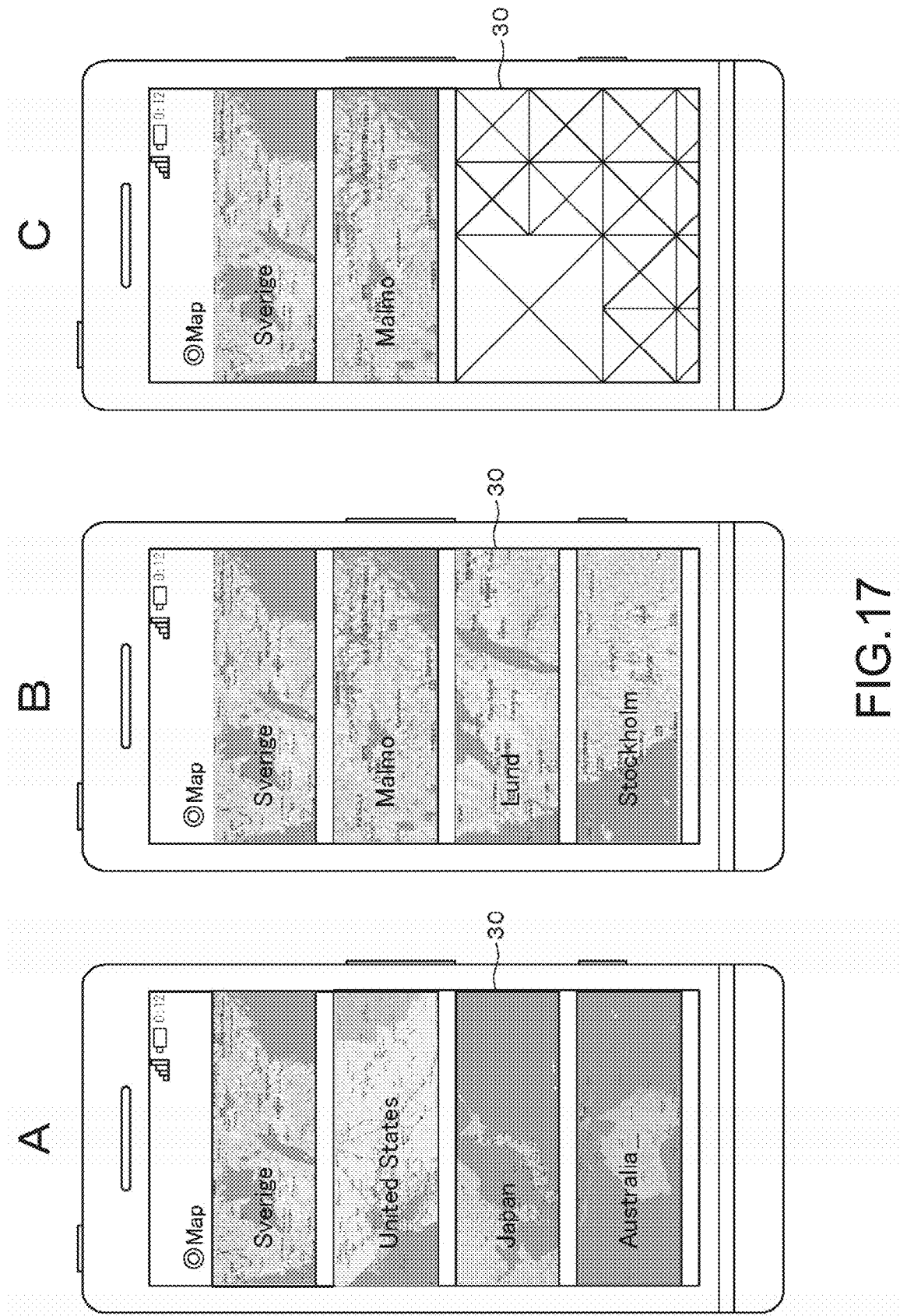
FIG. 17A to FIG. 17C each is a diagram showing a second alternative embodiment of a display according to the present technology.

FIG. 17 shows a second alternative embodiment of an image display mode according to the present technology. FIG. 17A is a represented image display of the "film location" category. FIG. 17A shows four groups of country names Sverige, United States, Japan, and Australia. If a user selects Sverige from the groups, for example, the display is switched to the state shown in FIG. 17B.

In the display state shown in FIG. 17B, areas of Malmo, Lund, and Stockholm are shown as the subgroups of the group "Sverige". The display mode is similar to the represented image display. If a user selects Malmo from the groups, the display is switched to the state shown in FIG. 17C.

In the display state shown in FIG. 17C, the images included in the group "Malmo" selected are shown in the mode of the summary hierarchical display. All images displayed here are based on the images captured at the location included in the area Malmo. In this manner, the image may be displayed in the display mode different from the hierarchical displays such as the represented image display, the summary hierarchical display, and the detailed hierarchical display in the embodiment.

Figure 18:
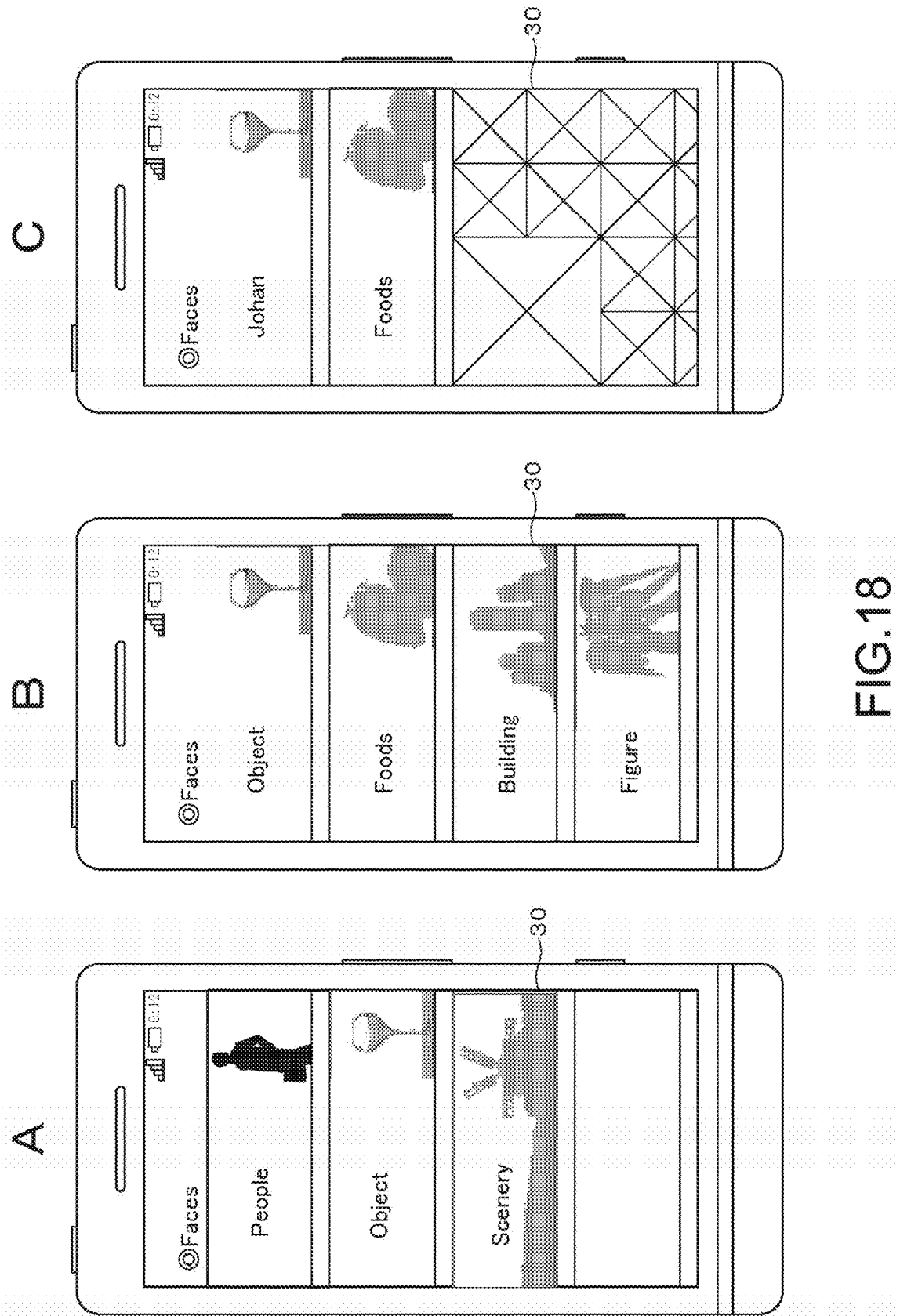
FIG. 18A to FIG. 18C each is a diagram showing a third alternative embodiment of a display according to the present technology.

FIG. 18 shows a third alternative embodiment of an image display mode according to the present technology. FIG. 18A is a represented image display and shows groups of People, Object, and Scenery. The People is a group that collects the photographic subject as a person. The Object is a group that collects the photographic subject as an object. The Scenery is a group that collects the photographic subject as a scene.

If a user selects the group "Object" from the groups, the display is switched to the state shown in FIG. 18B. In the display state shown in FIG. 18B, Foods, Building, and Figure are displayed as the subgroups in the group "Object". The display mode is similar to the represented image display. If a user selects Foods from the groups, the display is switched to the state shown in FIG. 18C.

In the display state shown in FIG. 18C, the images included in the subgroup "Object" selected are shown in the mode of the summary hierarchical display. All images displayed here are based on the images included in Object. In this manner, the image may be displayed in the display mode different from the hierarchical displays such as the represented image display, the summary hierarchical display, and the detailed hierarchical display in the embodiment.

Figure 19:
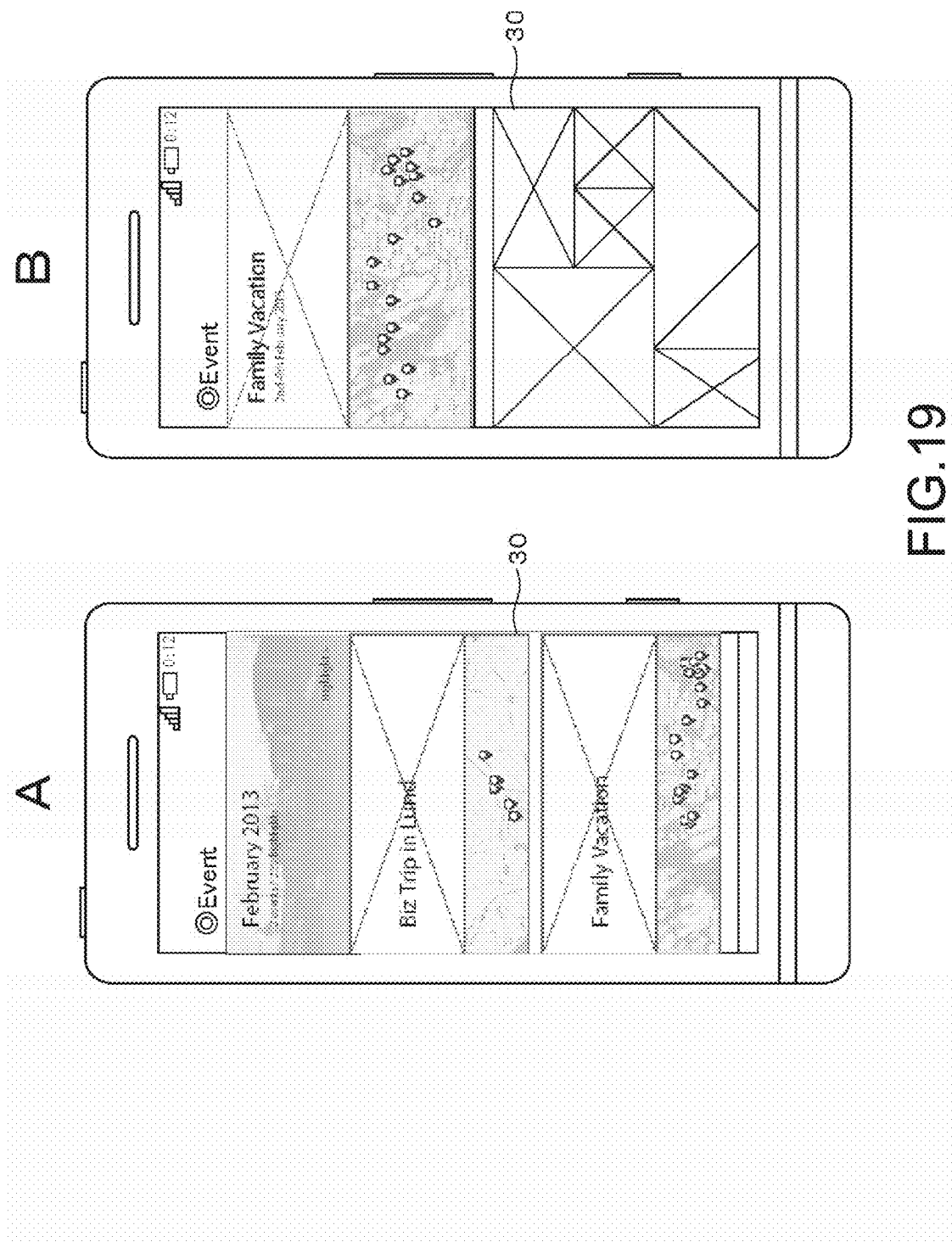
FIG. 19A and FIG. 19B each is a diagram showing a fourth alternative embodiment of a display according to the present technology.

FIG. 19 shows a fourth alternative embodiment of an image display mode according to the present technology. FIG. 19A is a represented image display of the "event" category. If the category is the "event", a map showing the position where the image is captured may be displayed together with the image.

If a user selects the group, the display is switched to the state shown in FIG. 19B. Note that the fourth alternative embodiment is applicable to the "film location" category. The images included in the groups "event" or "film location" may be horizontally long or vertically long due to a panoramic photograph. If there is a panoramic photograph, the image may be displayed by changing its size per image, as shown in FIG. 19B.

Figure 20:
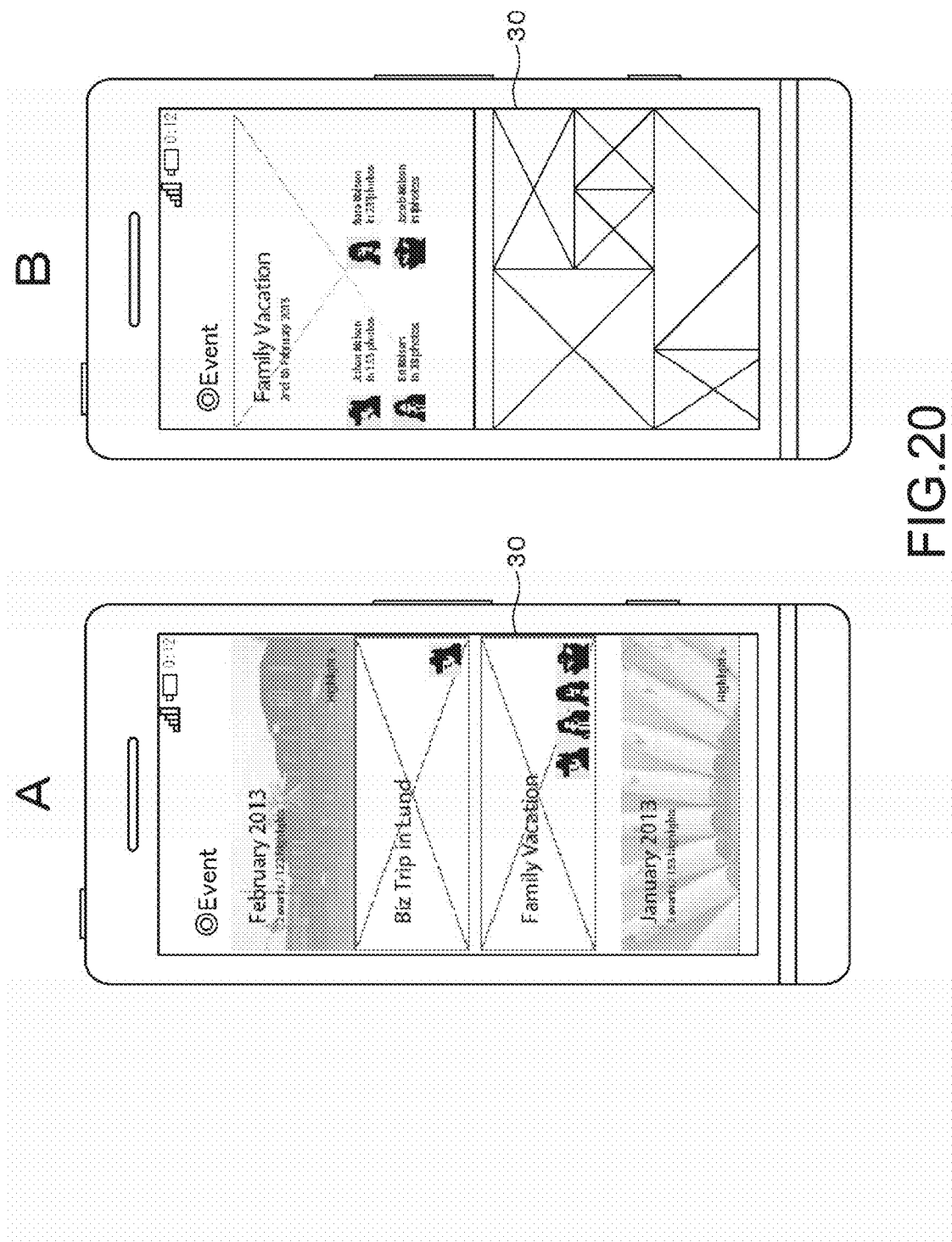
FIG. 20A and FIG. 20B each is a diagram showing a fifth alternative embodiment of a display according to the present technology.

FIG. 20 shows a fifth alternative embodiment of an image display mode according to the present technology. FIG. 20A is a represented image display form of the "event" category. In the fifth alternative embodiment, information about persons as the photographic subjects in the image included in the group is displayed on the represented image as icons.

If a user selects the group, it switches to the state shown in FIG. 20B. Also in this display mode, the persons as the photographic subjects in the image included in the group are displayed as the icons. In this way, it can be easily recognized which person is captured on a plurality of the images included in the group. Note that the display is done by a photographic subject recognition technique to recognize the person captured on the image based on the recognition result.

It should be noted that group names, place names, person names are only illustrative.

In the embodiments, the description is based on that the display control apparatus 10 operates in a smartphone. However, the device on which the display control apparatus 10 operates is not limited to the smartphone. Other examples of the devices on which the display control apparatus 10 operates include a tablet terminal, a personal computer, and a television receiver.

Figure 21:
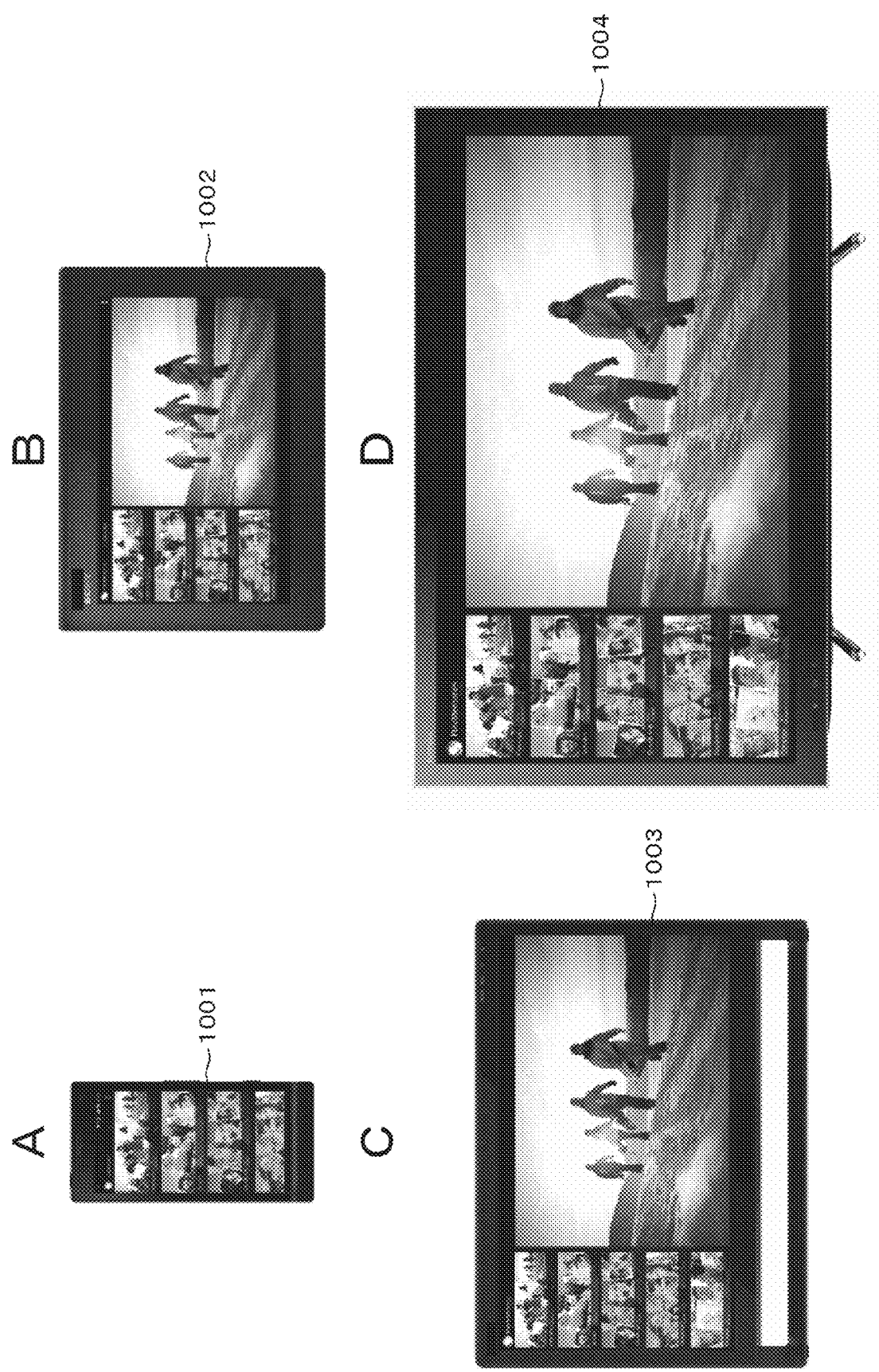
FIG. 21 diagrams each showing an alternative embodiment of the present technology.

FIG. 21 shows example modes of represented image displays in the case of applying the display control apparatus 10 to a smartphone 1001, a tablet terminal 1002, a personal computer 1003, and a television receiver 1004. The smartphone 1001 shown in FIG. 21A is similar to the display mode in the embodiment.

The tablet terminal 1002 in FIG. 21B, the personal computer 1003 in FIG. 21C, and the television receiver 1004 in FIG. 21D each has a display unit larger than that of the smartphone 1001. Accordingly, the image selected by the user can be enlarged to be displayed in addition to the represented image display of each group. In this way, as the image selected is always displayed in a large scale while the category is switched. Therefore, the user can search the image while enjoying the images.

In addition, as the personal computer 1003 in FIG. 21C and the television receiver 1004 in FIG. 21D each has the display unit larger than that of the smartphone 1001, the number of displays of the group in the represented image display can be increased as compared with the number of displays of the smartphone 1001. In this way, an image can be searched conveniently.

FIG. 22A shows example modes of a summary hierarchical display in the case of applying the display control apparatus 10 to a smartphone 2001, a tablet terminal 2002, a personal computer 2003, and a television receiver 2004. The smartphone 2001 shown in FIG. 22A is similar to the display mode in the embodiment.

As the tablet terminal 2002 in FIG. 22B, the personal computer 2003 in FIG. 22C and the television receiver 2004 in FIG. 22D each has the display unit larger than that of the smartphone 2001, the number of displays of the subgroup in the summary hierarchical display can be increased as compared with the number of displays of the smartphone 2001. In this way, an image can be searched conveniently.

Figure 22:
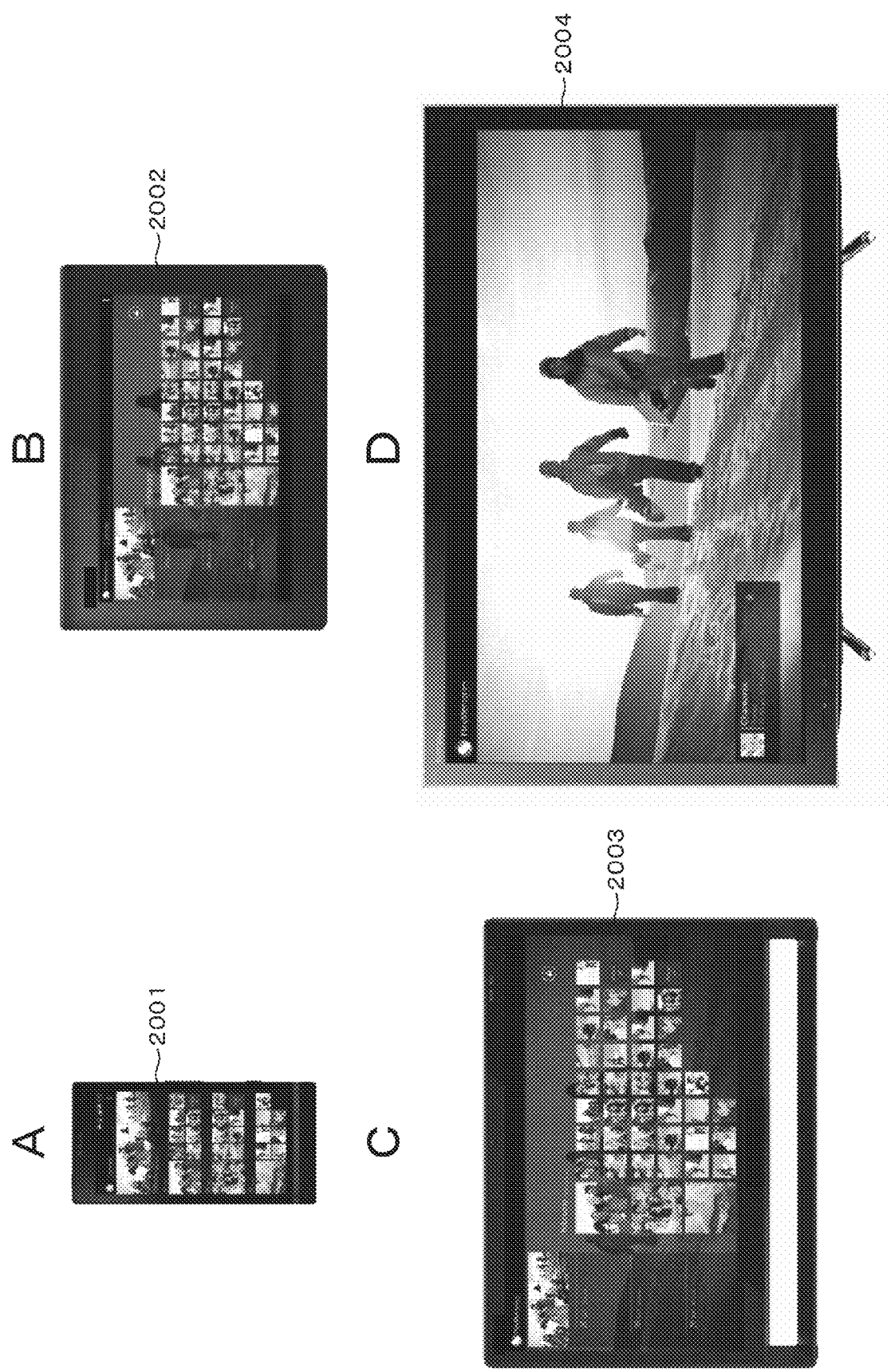
FIG. 22A is a diagram showing a display example of a summary hierarchical display in the case of applying the present technology to a smartphone.
FIG. 22B is a diagram showing a display example of a summary hierarchical display in the case of applying the present technology to a tablet terminal.
FIG. 22C is a diagram showing a display example of a summary hierarchical display in the case of applying the present technology to a personal computer.
FIG. 22D is a diagram showing a display example of a summary hierarchical display in the case of applying the present technology to a television receiver.

In the television receiver 2004 having the display unit with the largest size in FIG. 22, the image selected by the user is displayed in a full screen as shown in FIG. 22D, thereby providing the user with a powerful image.

Figure 23:
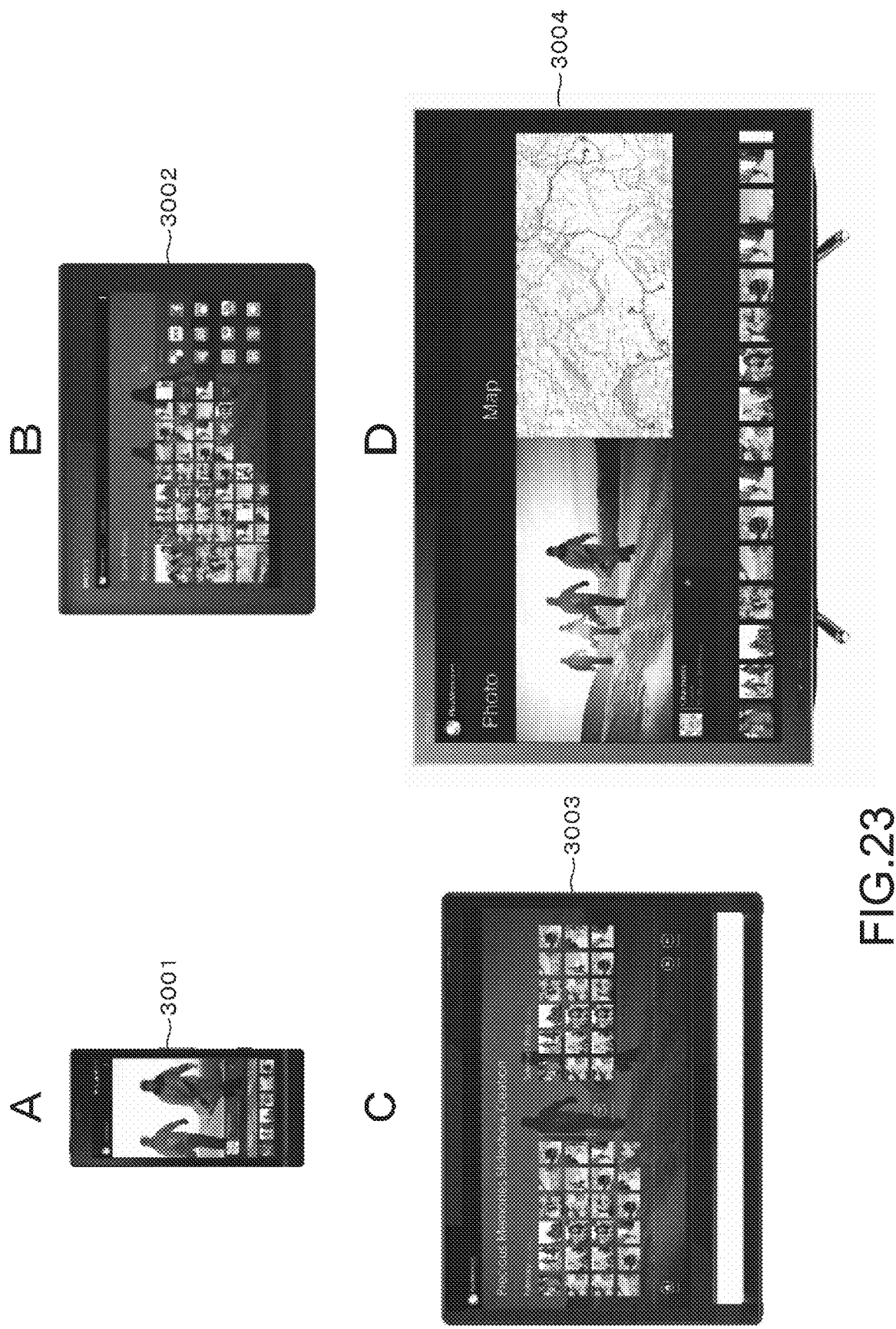
FIG. 23 is a diagram showing a display example and a map in the case of applying the present technology to a television receiver.

FIG. 23 shows examples of a combination of the image display and anything other than the image display, if the display control apparatus 10 is applied to the device having a large-sized display unit. In a tablet terminal 3002 in FIG. 23B, the images are displayed in the summary hierarchical display at one part of the display, and a group of icons showing applications installed in a tablet terminal 3003 is displayed at the other part of the display. By the display mode, other applications can be activated without switching the screen, while displaying by the display control apparatus 10.

In a personal computer 3003 in FIG. 23C, the images are displayed in the summary hierarchical display at one part of the display, and screens of image edit applications are displayed at the other part of the display. By the display mode, operations on the image edit applications can be performed, while the images are checked with the display by the display control apparatus 10.

It should be noted that the applications are not limited to the image edit applications, and may be applications not relating to the image such as a moving image creation application and a music application.

Furthermore, in a television receiver 3004 in FIG. 23D, a map is displayed in addition to the display by the display control apparatus 10. In this way, it is possible to display the position where the image is captured as a map by referring to GPS data corresponded to the image displayed.

It should be noted that the combination of the above-described devices and the display is only example. For example, in the tablet terminal, the display by the display control apparatus 10 and the image edit applications may be displayed. In the personal computer, the display by the display control apparatus 10 and the map may be displayed.

In the embodiments, the image data is used for description. The present technology is also applicable to moving image data and music content data. In the case of the moving image data, a capture image of the moving image is displayed as an image as described in the embodiment, thereby improving a searching ability of the moving image.

In the case of the music content data, icons showing art works are displayed as images as described in the embodiment, thereby improving a searching ability of the music. As a category, a group, and a subgroup of the music, an import time, a genre, a musician, an album, a favorite, and a play list are conceivable.

The present technology may have the following configurations.

(1) A display control apparatus, including:
a display control unit for controlling a display unit for displaying an image,
the display control unit being configured to
display a plurality of represented images that represent a plurality of image groups classified depending on related information of the images on the display unit in a first display mode, and
display related images relating to the represented images between a plurality of the represented images displayed in the first display mode depending on a user input on the display unit in a second display mode.

(2) The display control apparatus according to (1), in which
the first display mode is to arrange and display a plurality of the represented images representing each of a plurality of the image groups.

(3) The display control apparatus according to (1) or (2), in which
the user input is to select any of a plurality of the represented images, and
the second display mode is to dispose a related image display area between the represented image selected by the user and other represented image, and to display the related image relating to the represented image selected on the represented image display area.

(4) The display control apparatus according to (3), in which
in the state where the related image is displayed in the second display mode, the related image is displayed in a third display mode depending on the user input.

(5) The display control apparatus according to (4), in which the third display mode is to display all the related images relating to the represented image selected.

(6) The display control apparatus according to any one of (1) to (5), in which
the first display mode is to superimpose and display the related image relating to the represented image on the display of the represented image.

(7) The display control apparatus according to any one of (1) to (6), in which
the related image selected is singly displayed if any of the related images displayed in the second display mode is selected by the user.

(8) The display control apparatus according to (4) or (5), in which
the related image selected is singly displayed if any of the related images displayed in the third display mode is selected by the user.

(9) The display control apparatus according to any one of (1) to (8), further including:
an image classification unit for classifying the images depending on the related information.

(10) The display control apparatus according to (3) or (4), in which,
in the second display mode, there are a predetermined number of the images displayed on the represented image display area.

(11) The display control apparatus according to any one of (1) to (10), in which
the related images are determined based on a predetermined evaluation value.

(12) The display control apparatus according to any one of (1) to (11), in which
the display control unit collectively displays the images, and switches the display of the images from one category to the other category depending on the user input.

(13) The display control apparatus according to any one of (1) to (12), in which
the display control unit collectively displays the images, and
in the state where a plurality of the represented image are displayed in the second display mode, the image related to the related image selected is displayed in the second display mode depending on an input to instruct a category switching under the state that any of a plurality of the related images is selected.

(14) The display control apparatus according to any one of (1) to (13), in which
the user input is to be done to a touch panel.

(15) The display control apparatus according to (14), in which
an input to instruct a switch of the image display from one category to the other category is made by a flick operation to the tough panel.

(16) The display control apparatus according to (14), in which
the input to select any of a plurality of the represented images is performed by a tap operation to the touch panel.

(17) The display control apparatus according to any one of (1) to (16), in which
the images are already uploaded in the Internet service, and
the display control unit collectively displays the images already uploaded in the Internet service.

(18) The display control apparatus according to any one of (1) to (17), in which the images are already imported to an application, and
the display control unit collectively displays the images
already imported to the application.

(19) A method of controlling a display, including:
displaying a plurality of represented images that represent a plurality of image groups classified depending on related information of the images on the display unit for displaying the images in a first display mode, and
displaying related images relating to the represented images in a second display mode between a plurality of the represented images displayed in the first display mode depending on a user input.

(20) A display control program for executing a method of controlling a display by a computer, the method including:
displaying a plurality of represented images that represent a plurality of image groups classified depending on related information of the images on the display unit for displaying the images in a first display mode, and
displaying related images relating to the represented images between a plurality of the represented images displayed in the first display mode depending on a user input.

DESCRIPTION OF SYMBOLS 10 display control apparatus
11 display control unit
20 display unit
12, 40 image classification unit

The invention claimed is:

1. A display control apparatus, comprising:
a display control unit for controlling a display unit for displaying images, the display control unit configured to:
display, in a first display mode, a plurality of represented images, each represented image of the plurality of represented images being in a category that represents one image group of a plurality of image groups and classified by related information of the images on the display unit,
set, in the first display mode, the each represented image of the plurality of represented images as a background image for a corresponding one of the plurality of image groups,
superimpose, in the first display mode, at least one related image in a set of related images onto one of the plurality of represented images, wherein a first boundary of the at least one related image is smaller than a second boundary of the one of the plurality of represented images, wherein a first portion of the first boundary is within the second boundary, and wherein a remaining portion of the first boundary does not extend outside of the second boundary, and
change a display of a first portion of the set of related images for one of the plurality of image groups from the first display mode to a second display mode based on a first user input.

2. The display control apparatus of claim 1, wherein, in the second display mode, the first portion of the set of related images are arranged in a large size image display area and a small size image display area.

3. The display control apparatus of claim 2, wherein the large size image display area displays a single image, and wherein the small size image display area displays a plurality of images.

4. The display control apparatus of claim 1, wherein, in the second display mode, a map corresponding to the set of related images is displayed.

5. The display control apparatus of claim 4, wherein the map is displayed between the one of the plurality of represented images that are related to the set of related images and the first portion of the set of related images.

6. The display control apparatus of claim 4, wherein a location where at least one image of the set of related images was captured is displayed on the map.

7. The display control apparatus of claim 1 wherein the display control unit is further configured to:
display a second portion of the set of related images in a third display mode based on a second user input.

8. The display control apparatus of claim 1, wherein the display control unit is further configured to:
display a plurality of maps corresponding to the plurality of image groups displayed in the first display mode, wherein a map corresponding to the one of the plurality of image groups is positioned between the represented image that is related to the set of related images and another represented image of the plurality of image groups.

9. The display control apparatus of claim 1, wherein the related information of the images includes:
a percentage of a face occupying an image,
whether a face is smiling,
an orientation of a face relative to the image,
a number of persons in the image, or
a combination of the above.

10. The display control apparatus of claim 9, wherein the set of related images are assigned a score based on the related information.

11. The display control apparatus of claim 10, wherein the display control unit is further configured to select one of the set of related images having a highest score as the represented image for the category.

12. A method of controlling a display unit, the method comprising:
controlling, with an electronic processor, the display unit to display a plurality of represented images in a first display mode, each represented image of the plurality of represented images being in a category that represents one image group of a plurality of image groups and classified by related information of images on the display unit, and the each represented image of the plurality of represented images being set as a background image for a corresponding one of the plurality of image groups;
superimposing, with the electronic processor, at least one related image in a set of related images onto one of the plurality of represented images, wherein a first boundary of the at least one related image is smaller than a second boundary of the one of the plurality of represented images, wherein a first portion of the first boundary is within the second boundary, and wherein a remaining portion of the first boundary does not extend outside of the second boundary; and
controlling, with the electronic processor, the display to change a display of a first portion of the set of related images for one of the plurality of image groups from the first display mode to a second display mode based on a first user input.

13. The method of claim 12, wherein, in the second display mode, the first portion of the set of related images are arranged in a large size image display area and a small size image display area.

14. The method of claim 13, wherein the large size image display area displays a single image, and wherein the small size image display area displays a plurality of images.

15. The method of claim 12, further comprising:
displaying a map corresponding to the set of related images.

16. The method of claim 15, further comprising:
displaying a location where at least one image of the set of related images was captured on the map.

17. The method of claim 12, further comprising:
displaying, in a third display mode, a second portion of the set of related images based on a second user input.

18. The method of claim 17, further comprising:
assigning, to each image in the set of related images, a score based on the related information; and
selecting one of the set of related images having a highest score as the represented image for the category.

19. The method of claim 12, wherein the related information of the images includes one or more of:
a percentage of a face occupying an image,
whether a face is smiling,
an orientation of a face relative to the image,
a number of persons in the image, or
a combination of the above.

20. A non-transitory computer readable medium storing display control program code that, when executed by a computer, causes the computer to perform a set of operations comprising:
controlling a display unit to display a plurality of represented images in a first display mode, each represented image of the plurality of represented images being in a category that represents one image group of a plurality of image groups and classified based on related information of images on the display unit, and the each represented image of the plurality of represented images being set as a background image for a corresponding one of the plurality of image groups;
superimposing at least one related image in a set of related images onto one of the plurality of represented images, wherein a first boundary of the at least one related image is smaller than a second boundary of the one of the plurality of represented images, wherein a first portion of the first boundary is within the second boundary, and wherein a remaining portion of the first boundary does not extend outside of the second boundary; and
controlling the display to change a display of a first portion of the set of related images for one of the plurality of image groups from the first display mode to a second display mode based on a first user input.

* * * * *